United States Patent [19]

Hirata et al.

[11] 4,240,720
[45] Dec. 23, 1980

[54] MOTION PICTURE CAMERA

[75] Inventors: Noritsugu Hirata, Yokohama; Hiroyuki Takimoto, Urawa, both of Japan

[73] Assignee: Canon Kabushiki Kaisha, Tokyo, Japan

[21] Appl. No.: 934,335

[22] Filed: Aug. 16, 1978

[30] Foreign Application Priority Data

Aug. 23, 1977 [JP] Japan ................... 52-101260

[51] Int. Cl.³ .............................................. G03B 31/02
[52] U.S. Cl. ................................ 352/170; 352/14; 352/176; 352/180
[58] Field of Search ............... 352/170, 171, 173–177, 352/14, 159, 184, 180; 226/44, 45; 242/183

[56] References Cited

U.S. PATENT DOCUMENTS

| | | | |
|---|---|---|---|
| 2,933,009 | 4/1960 | Ulahos | 352/170 |
| 3,519,340 | 7/1970 | Vockenhuber et al. | 352/171 |
| 4,059,349 | 11/1977 | Komine et al. | 352/174 X |
| 4,079,398 | 3/1978 | Ichiyanagi et al. | 352/175 X |
| 4,096,500 | 6/1978 | Lermann et al. | 354/173 |
| 4,118,737 | 10/1978 | Chambers et al. | 352/176 X |

FOREIGN PATENT DOCUMENTS 2260808  5/1975  France ........................... 352/14

Primary Examiner—L. T. Hix
Assistant Examiner—William B. Perkey
Attorney, Agent, or Firm—Fitzpatrick, Cella, Harper & Scinto

[57] ABSTRACT

A motion picture camera has a film receiving chamber with an image recording location and a sound recording location. When a sound film is loaded, it is guided to through both locations whereas when a silent film is loaded, it is guided through only the image recording location. A first film feed device and a second film feed device are provided; the first of which transports the film at the image recording location intermittently and the second film feed device transports the film at the sound recording location at a substantially constant speed. Apparatus are provided to detect disorder or abnormal change in operations of the camera and to stop the motion of the camera when such change occurs.

2 Claims, 31 Drawing Figures

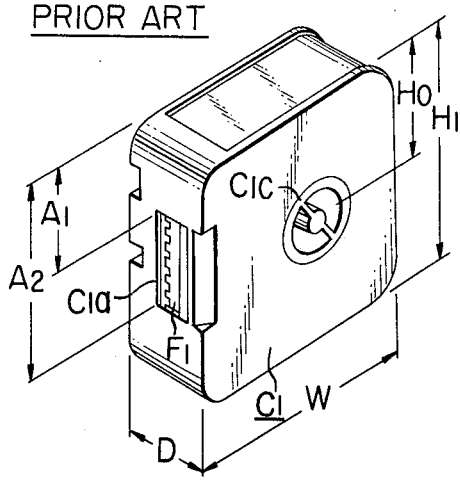
FIG. IA
PRIOR ART
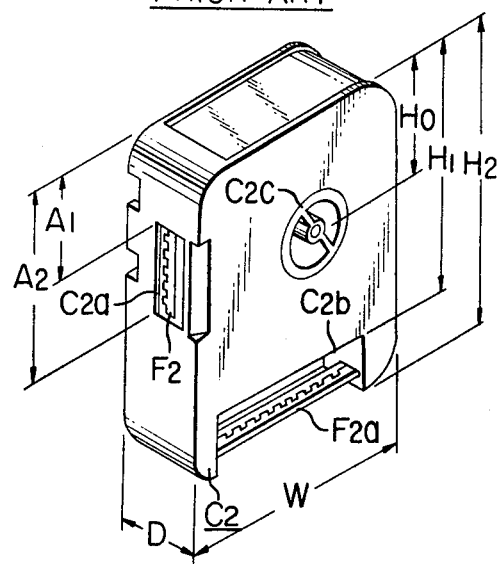
FIG. IB
PRIOR ART
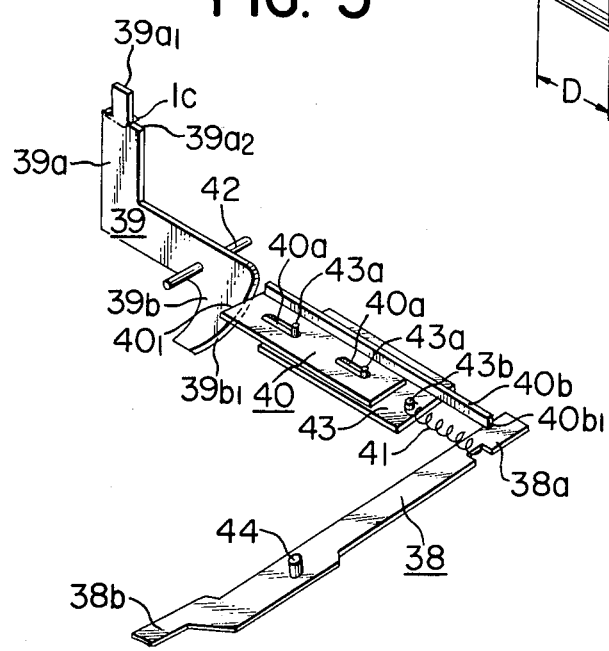
FIG. 5

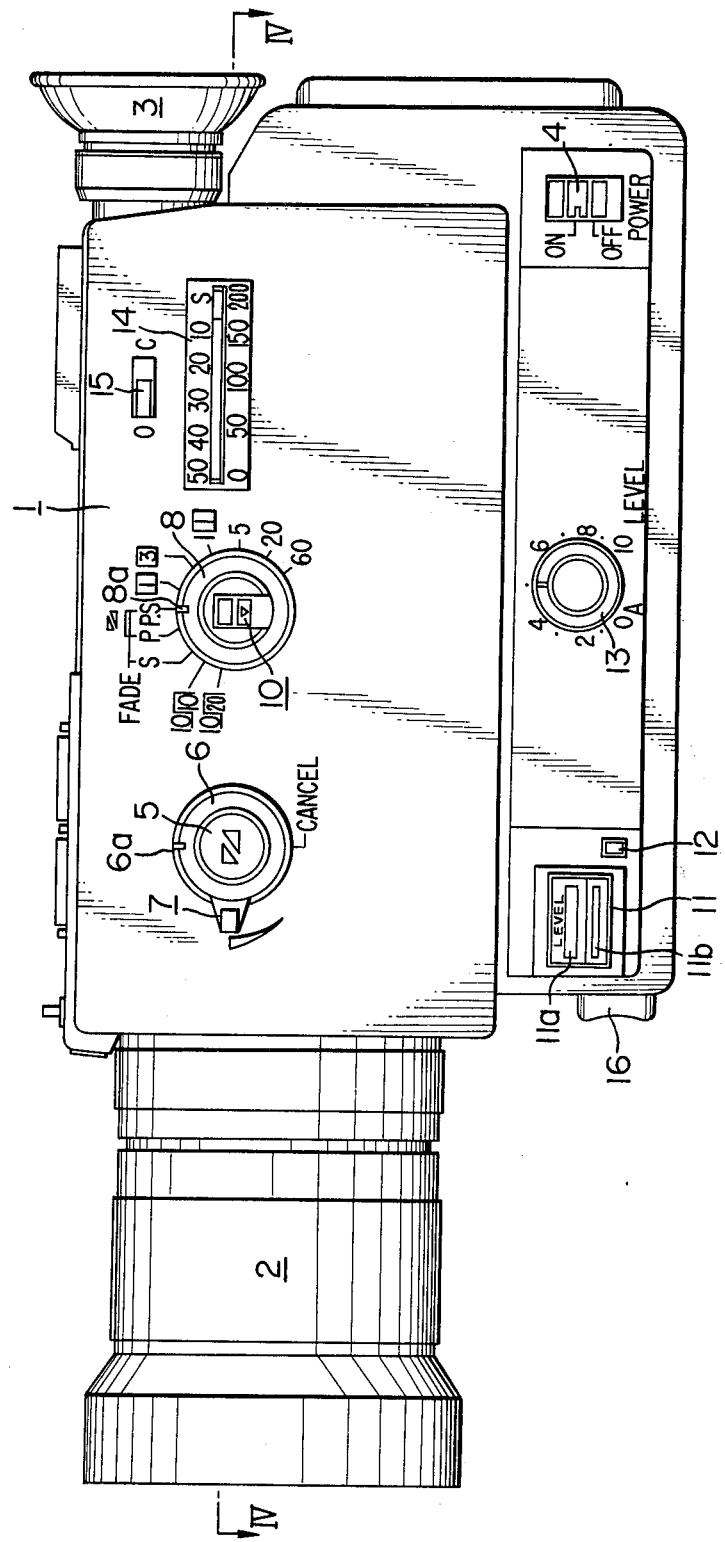

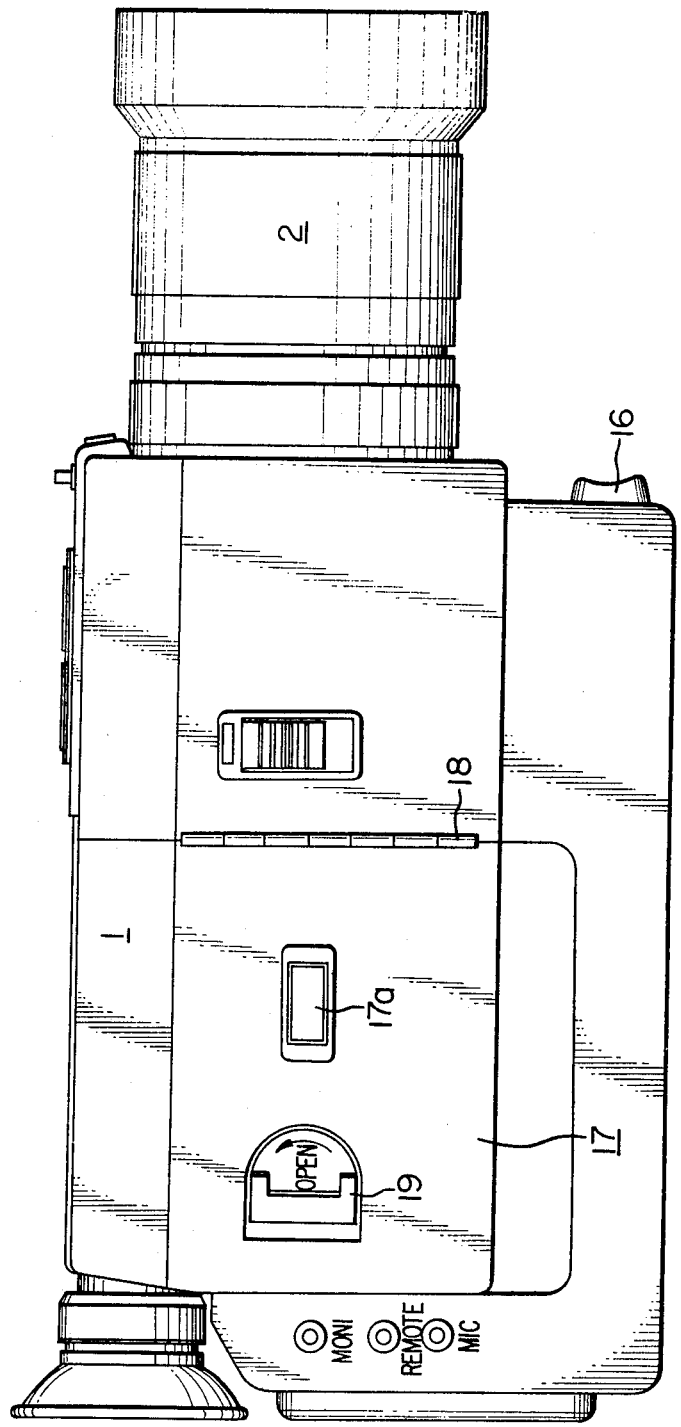

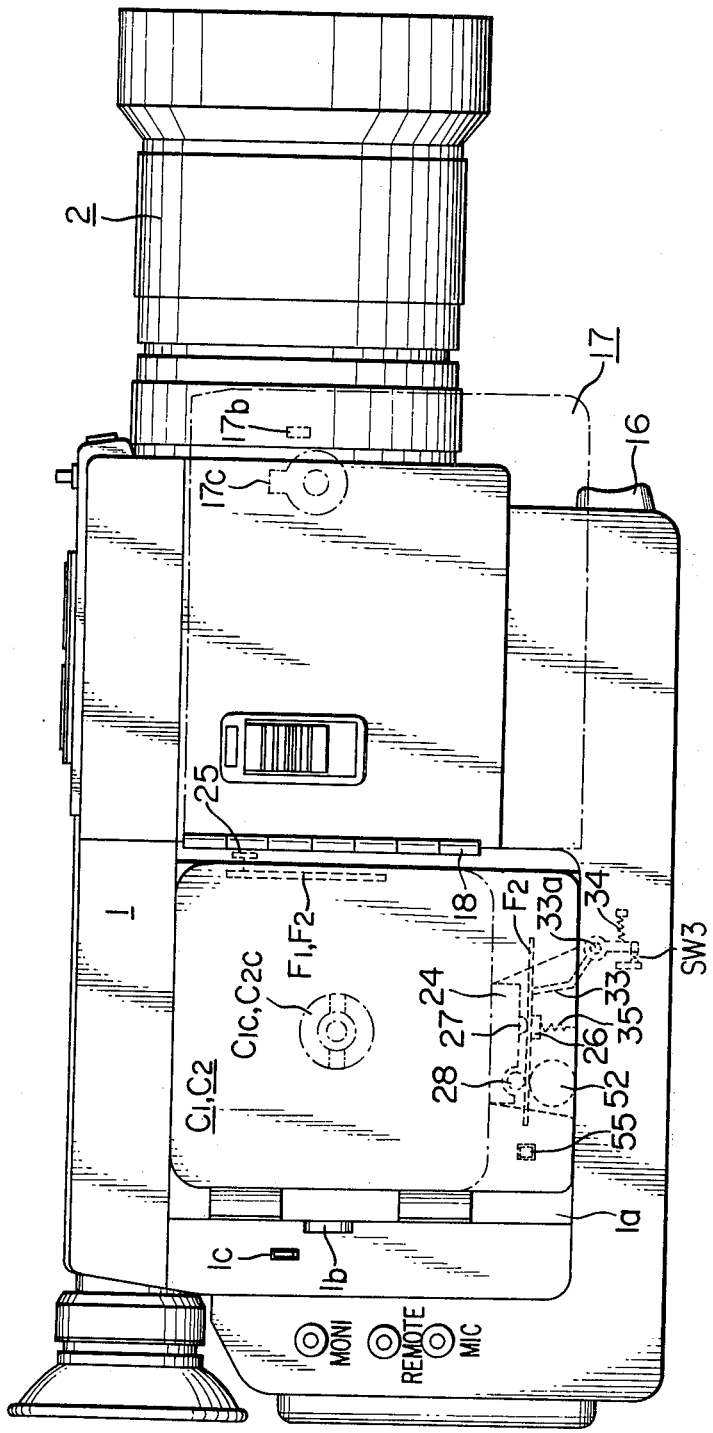

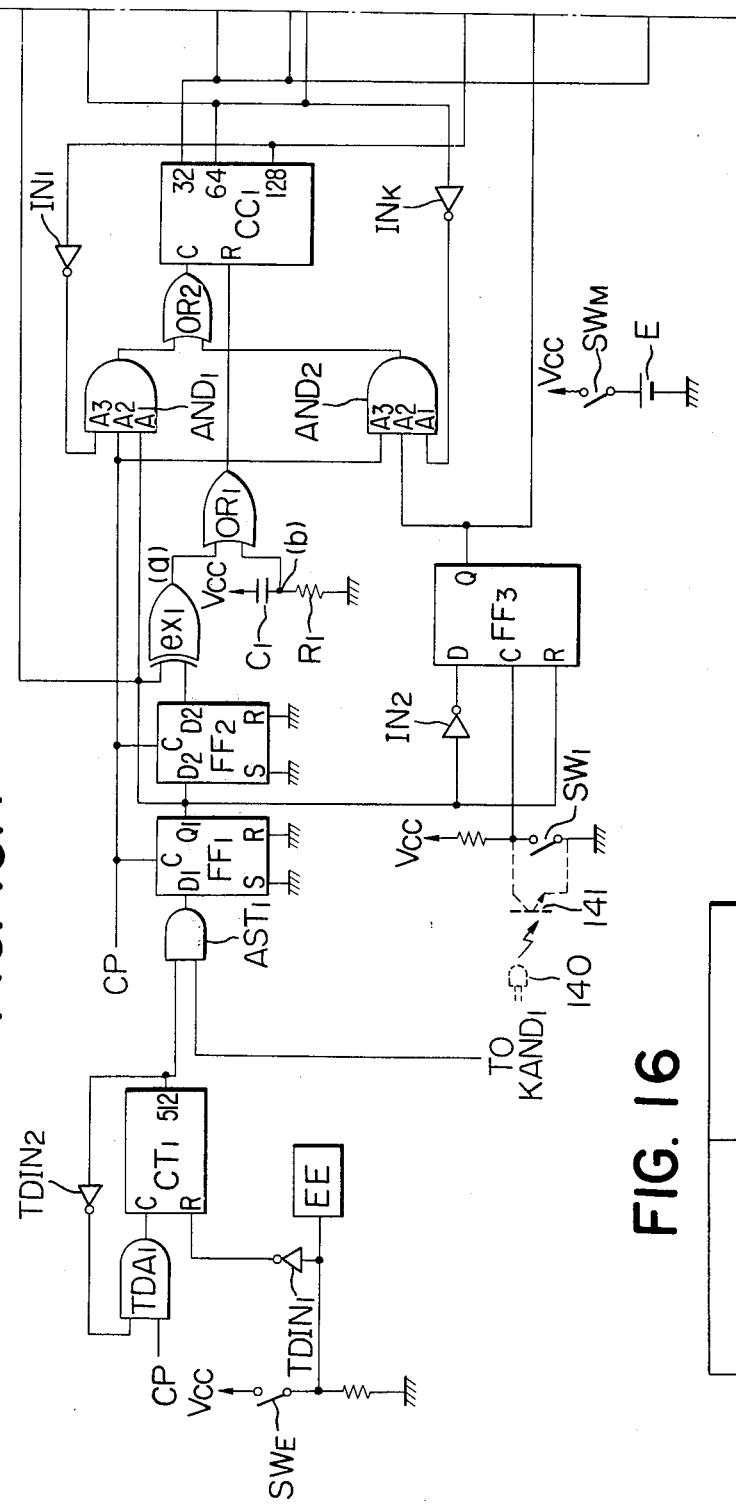

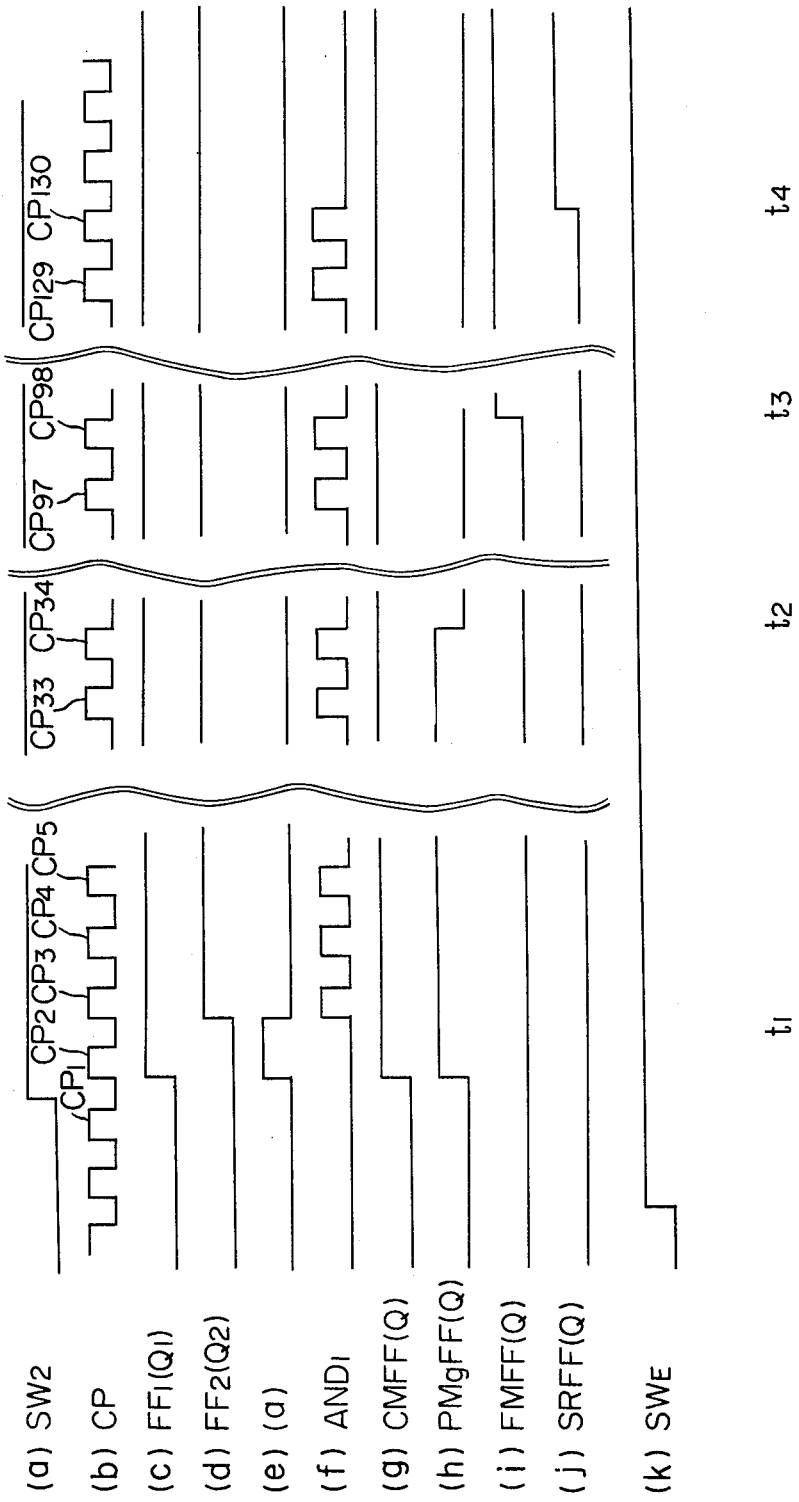

MOTION PICTURE CAMERA

BACKGROUND OF THE INVENTION

1. Field of the Invention

The present invention relates to a sound motion picture camera.

2. Description of the Prior Art

At present, there is commercially available such type of film for use in motion picture cameras which allows one not only to optically record image information but also to magnetically record sound information on one and the same film. This type of film is generally called "sound film". One example of such type of film is a motion picture film sold by Eastman Kodak Company under the trade name "Sound Movie Film". As to this sound film, a detailed description has been made in the patent specification of U.S. Pat. No. 3,858,968 assigned to Eastman Kodak Company.

As seen from the above mentioned patent specification, this sound film of Eastman Kodak Company is formed by adding a strip of magnetic recording material along one side edge on one surface of a conventional silent film. This film is encased in a cassette. The cassette with the film contained therein is inserted into the cassette-receiving chamber of a camera to use the film. The sound film cassette has an opening for exposure and an opening for sound recording provided on the body of the cassette at two different positions. Within the body of the cassette, there are disposed coaxially a supply spool and a take-up spool. The sound film contained in the cassette is reeled up onto the take-up spool from the supply spool passing through the opening for exposure and the opening for sound recording.

Sound motion picture cameras adapted for such sound film, are also known and commercially available. For example, mention may be made of U.S. Pat. No. 3,880,504, U.S. Pat. No. 771,864, U.S. Defensive Publication No. T920,009 and U.S. Pat. No. 3,825,327. These known sound motion picture cameras are provided with some particular elements and devices which silent motion picture cameras conventionally used for a long time do not have. A sound motion picture camera is distinguished from a silent motion picture camera in that for the former there are additionally provided at least two devices, that is, a sound recording circuit device comprising a magnetic head for magnetically recording sound information on the magnetic recording material of the sound film and a film feeding device for transporting the sound film at a substantially constant speed directing it to the magnetic head.

At a position correctly aligned with the above mentioned image recording location in the cassette-receiving chamber where the opening for exposure of the cassette is to be located when the sound film cassette is properly loaded into the chamber, there are disposed an image forming device of the sound motion picture camera and the first film feeding device which engages with the sound film to intermittently transport it toward the opening for sound recording. Also, at a position correctly aligned with the above mentioned sound recording location in the chamber, the camera has the magnetic head of the sound recording circuit device and the sound film feeding device which engages with the sound film at the opening for sound recording so as to transport the film at a substantially constant speed relative to the magnetic head.

Thus, within the sound motion picture camera loaded with the sound film cassette, recording of image information on the loaded film is effected at the position of the opening for exposure through the image forming device and recording of sound information associated with the image information is effected at the position of the opening for sound recording on the magnetic recording material applied to the same film through the magnetic head.

Image information and sound information associated with each other and recorded together on one and the same sound film are shifted from each other by a given distance with respect to the position of the recorded information on the film. This distance from the image information to the sound information on one and the same sound film is standardized to correspond to about eighteen picture frames for all such sound films manufactured by different film manufacturers. Therefore, the information recorded on the sound film may be reproduced by using a moving picture projector of any manufacturer. The standardization of shift distance from image information to sound information assures the matching of image to sound without distinction of manufacturer of projector to be used. However, on the other hand, in view of the camera side, this requires a precise feeding of film within a sound motion picture camera. The length of film segment existing between a part of the film carrying image information recorded thereon and a part of the film carrying sound information recorded thereon should be maintained always approximately constant. In other words, the speed at which the first film feeding device intermittently transports the film for a unit of time and the speed at which the second film feeding device substantially constantly transports the film for the same unit of time should be maintained constant always. This is very difficult to actually attain. For example, power transmission apparatus and the like interposed between the first and second film feeding devices will cause some difference in speed between the two feeding devices even when a common driving motor is used for driving both the two devices. When two separate driving motors made according to the same standard are used one for the first film feeding device and another for the second one, it is very difficult practically to make equal the speed at which the first feeding device transports the film to the speed of the second one.

In case that the film transporting speed of the second one is lower than that of the first one, the length of film segment extending from the first feeding device to the second one is unduly increased to the extend that a jamming of the film may be caused and thereby the film may be bent and damaged. In such a case, the first and second film feeding devices can no longer operate properly.

On the contrary, if the film transporting speed of the second feeding device exceeds that of the first one excessively, the film will be subjected to an unduly large stretching force at the segment between the two feeding devices and the film portion lying at the opening for exposure of the cassette will be forcibly stretched at the time of exposure which in turn prevents image information from being recorded on the film exactly. In the worst case, there may occur damage and breaking of the film.

In order to avoid these troubles, it has been already known to provide a speed control device for sound motion picture camera according to the prior art. The speed control device comprises a loop sensor for detecting the length of film segment extending between the two film feeding devices. When the film length is increased or decreased over or under a predetermined value of length, either one or both of the two film feeding devices are controlled to increase or decrease the film transporting speed so as to keep the length of the film segment almost constant. Sound motion picture cameras provided with such speed control device comprising a loop sensor are disclosed, for example, in U.S. Defensive Publication No. T920,009, U.S. Pat. Nos. 4,003,643 and 4,000,496.

According to the prior art disclosed in the above-mentioned U.S. Defensive Publication No. T920,009 and U.S. Pat. No. 4,003,643, the first film feeding device is provided with a driving motor capable of being switched over from low speed to high speed or vice versa through a speed regulating circuit device. For the second film feeding device there is provided such driving motor which rotates at a substantially constant speed always. A loop sensor senses the film segment between the two film feeding devices and controls the speed regulating circuit device as the film length changes. When the length has become longer than a predetermined value, it is detected by the loop sensor and the speed of the driving motor for the first film feeding device is changed over to the low speed which is lower than the rotating speed of the driving motor for the second film feeding device. This changing-over of the motor speed is effected through the speed regulating circuit device. In a similar manner, when the length of the film segment existing between the two film feeding devices has become shorter than the predetermined value, the loop sensor detects it and changes over the driving motor for the first feeding device to the high speed condition through the speed regulating circuit device. The speed for the high speed condition is higher than the rotating speed of the driving motor for the second film feeding device. Thus, the film length between the first and second film feeding devices is maintained at a certain given value.

In the arrangement disclosed in U.S. Pat. No. 4,000,496, the positional relation of the constant speed motor and the variable speed motor is reversed to that of the above described prior art. Namely, a driving motor rotating at a substantially constant speed is used for the first film feeding device and a driving motor the speed of which is changed over from a high speed to a low speed or vice versa through a speed regulating circuit device is used for the second one. The function of the speed control system disclosed in this U.S. Pat. No. 4,000,496 is entirely the same as that of the above described prior art. When the film length between the two feeding devices becomes too long, it is detected by a loop sensor and the speed of the driving motor for the second film feeding device is switched over through the speed regulating circuit device to the high speed that is higher than the rotating speed of the driving motor for the first feeding device. On the contrary, if the film length becomes too short, then the loop sensor detects it and the speed of the driving motor for the second film feeding device is switched over to the low speed which is lower than the rotating speed of the driving motor for the first one. Thus, like the cases of the above described prior art, the film length between the first and second film feeding devices is maintained almost constant at a predetermined value.

Speed control systems as disclosed in the above described U.S. Defensive Publication No. T920,009, U.S. Pat. Nos. 4,003,643 and 4,000,496 are all the same in the point that one driving motor provided for one of the two film feeding devices is changed in speed relative to another driving motor provided for the other one of the feeding devices so as to maintain substantially constant the film length extending between the two feeding devices. However, there is a possibility of such operational trouble that the film feeding device with a constant speed motor may stop transporting the film or the transportation of the film may become extraordinally slow so that the other motor provided for the other film feeding device that is variable in speed gets out of control. If such trouble occurs, the film would fall in jam between the two film feeding devices or the film would be subjected to an untolerably large tension stress. As a result, the film may be bent, damaged and broken. Also, the recording of image information or sound information on the film may result in failure.

All the prior art speed control systems described above have no means for preventing such possible trouble. They lack of safety of film and of recording the information. For the known sound motion picture cameras it is therefore required to take some measure with which safety of film and safe recording of information can be assured.

In other words, all the prior art motion picture cameras have been designed taking into consideration only the requirement that the length of film extending between the first and second film feed devices should be kept constant. It has never been considered to positively stop feeding the film when the film length between the two film feed devices becomes abnormal.

Besides the typical troubles caused by any disordered operation of the film feed devices in feeding the film, there is another common trouble in transporting the film, which is trouble caused by any disorder in operation of the film winding device. Such trouble occurs even when the film feed devices operate normally. If the film winding device gets out of order for any reason, then the film will be jammed between the film take-up reel and the second film feed device which is operating normally. This jamming of film may cause bending or, in the worst case, breaking of the film. Therefore, for a motion picture camera, it is desirable that the camera be provided with means by which a detection can be made as to whether the operation of film winding is normal or not and the camera operation can be stopped at once when any disordered operation of film winding is detected.

SUMMARY OF THE INVENTION

Accordingly, it is an object of the invention to provide a motion picture camera which is provided with such device which, when the film feed device fails to feed film in a normal state, automatically detects it and automatically stops the operations of devices related with the feeding of film.

It is another object of the invention to provide a motion picture camera which is provided with means for maintaining the film length between the first and second film feed devices constant as well as detecting means for automatically detecting such abnormal state of the film as occurs when the film length between the two film feed devices is deviated from a given value to the extent that said maintaining means is no longer able to correct the deviation.

It is a further object of the invention to provide a motion picture camera which is provided with, in addition to the above means, further such means which automatically detects the above mentioned abnormal state of film feeding and automatically stops the operation of both the film feed devices.

It is an additional object of the invention to provide a motion picture camera which permits detection of any disordered operation of film winding device and automatically stops the operation of devices related with the film transportation when such disorder is detected.

Still a further object of the invention is to provide a motion picture camera which is provided with alarm means which can give the operator a notice of improper position of film when the loaded film is not correctly located in a proper position given for it.

Other and further objects, features and advantages of the invention will appear more fully from the following description taken in connection with the accompanying drawings.

BRIEF DESCRIPTION OF THE DRAWINGS

FIGS. 1A and 1B show examples of a commercially available film cassette preferably used together with the motion picture camera according to the invention, in which FIG. 1A is a perspective view of a silent film cassette and FIG. 1B is a similar view of a sound film cassette;

FIGS. 2A, 2B and 2C show embodiments of a motion picture camera according to the present invention in which FIG. 2A is a side view thereof, FIG. 2B is another side view thereof and FIG. 2C is the same view as FIG. 2B but with the cover of cassette receiving chamber being opened to show the chamber, and in FIG. 2C, the sound film cassette of FIG. 1B being loaded;

FIG. 5 is a detailed perspective view of the pinch roller presetting mechanism shown in FIG. 3;

FIGS. 16, 16A, and 16B shows an embodiment of a sequence control circuit used in the motion picture camera according to the invention;

FIG. 18 is a wave form chart for explaining the start sequence operation of the motion picture camera according to the invention;

DESCRIPTION OF THE PREFERRED EMBODIMENT

Figure 3A:
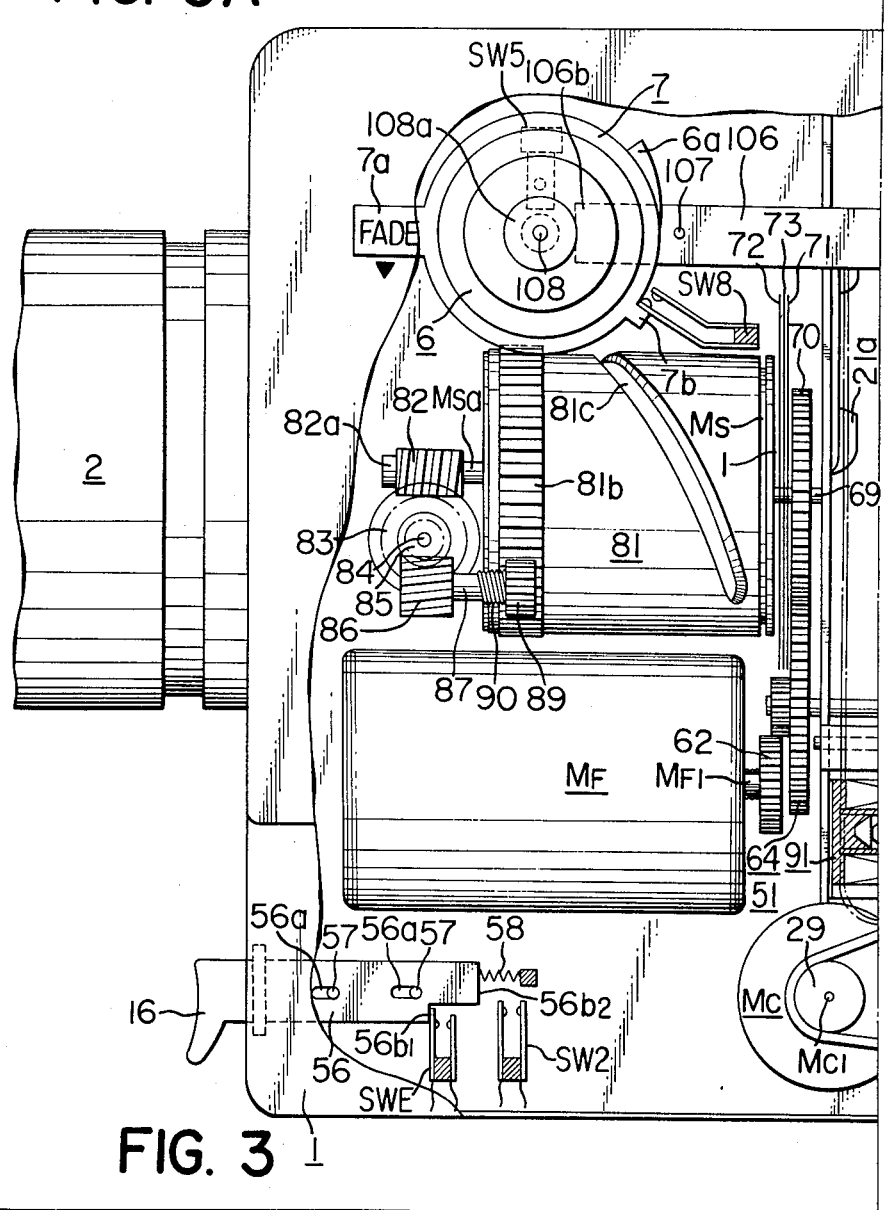
FIGS. 3, 3A, and 3B shows the mechanical arrangement and structure of the motion picture camera shown in FIGS. 2A, 2B and 2C.

Several embodiments of the cine camera according to the present invention will hereinafter be described by reference to the drawings. FIGS. 2 to 14 show mechanically constructed main mechanisms of the cine camera of the present invention. Designated by 1 is a camera body, 1a a cassette-receiving chamber formed in the camera body 1, 2 a photographic lens structure secured to the front face of the camera body 1, and 3 an eye-cap secured to the viewfinder portion of the camera body 1. Designated by 7 is a ring-shaped fade photography operating member pivotally supported on the camera body 1. The member 7 has an operating knob 7a disposed outwardly of the camera body 1, and a projected portion 7b for closing a normally opened switch SW8 secured to the interior of the camera body 1, said projected portion 7b being disposed at a position within the body 1 and capable of controlling the switch SW8. Designated by 6 is a ring-shaped, overlap photography cancel knob held within the cylinder of the fade photography operating member 7. The knob 6 has a control cam 6a inwardly of the camera body 1 which, when the knob is turned to a position until a pointer 6a corresponds to the mark "CANCEL" formed on the outer surface of the camera body and on the outer periphery of the knob 6, depresses a pin 107 studded in a sliding lever 106 for overlap photography operation which will later be described, to thereby cause the sliding lever 106 to be slidingly displaced toward the right in FIG. 3, and can cancel overlap photography while it is being carried out. Designated by 5 is an overlap photography starting button for starting overlap photography. This botton 5 is slidable in the cylinder of the knob 6. The botton 5 is secured to the one end of a slidable shaft 108 slidably held by a portion 1A of the camera body. The other end of the slidable shaft 108 is slidably disposed within an opening 1A₁ in the portion 1A and normally biased outwardly of the camera body 1 by a compression spring 109 also disposed in said opening 1A₁. The slidable shaft 108 has secured thereto a disc-like flange 108a and has a stopped portion 108b for closing the normally open switch SW5 when the botton 5 is depressed to displace the slidable shaft 108 inwardly. Denoted by 8 is a mode changeover operating ring secured to one end of a shaft 9 studded on a pivotable member 110 pivotally supported on the button wall 23 of the film-receiving chamber 1a. The shaft 9 has secured thereto a disc-like flange 111 having a cut-away 111a. The ring 8 is provided with a rotary switch mechanism 112 changeable-over in response to the rotational movement of the ring 8, and one electrical contact means 112a of this switch mechanism is secured to the inner surface of the ring 8 while the other electrical contact means 112b is secured to the camera body 1, a pointer 8a is provided on the ring 8. Symbols "10/20", "10/10", "S", "P", "P.S", "①", "③", "1", "5", "20" and "60" are successively provided on the outer surface of the camera body 1 and on the outer periphery of the ring 8, as in shown in FIG. 2(A). The pointer 8a may be adjusted to the position of any of these symbols by the rotation of the ring 8. Although not shown, a lock mechanism is provided on the lower surface of the ring 8, the lock mechanism being adapted to lock the ring 8 against rotation so that the pointer 8a is not moved from that pointer only when the pointer 8a on the ring 8 is at a portion aligned with the symbol "P.S" and adapted not to lock the ring 8 to permit free rotation thereof when the pointer 8a is aligned with any other symbol. Designated by 10 is a lock mechanism release button for unlocking the lock mechanism to point the ring 8 to freely rotate. The lock mechanism may be released when the button 10 is slid toward (downwardly) the mark provided on the button 10.

Reference number 11 denotes a display plate having a recording level display window 11a and a source voltage display window 11b, 12 a source voltage checker button, and 13 a recording level regulation operating dial. Designated by 14 is a footage counter display portion, and 15 an unshown eyepiece shutter operating member. Denoted by 16 is a trigger button, and 17 a cover for selectively covering the cassette inlet opening of the cassette-receiving chamber 1a. The cover 17 is secured to the camera body by means of a hinge 18. The cover 17 is provided with a display window 17a for confirming from the outside of the camera whether a film cassette is loaded in the cassette receiving chamber or which type of film cassette C1 or C2 is loaded in the cassette-receiving chamber, and has a projection 17b formed in the inner surface thereof. Designated by 19 is a knob of lock operating means for locking the cover 17. The knob 19 is secured to a shaft 20 pivotally supported on the cover 17, and the inner side of the cover 17 is provided with a key portion 17c for engaging or disengaging a key 1b formed in a part of the camera body 1 and adapted to be rotated with the shaft 20 when the latter is rotated by operating the knob 19.

In the front wall 21 of the cassette receiving chamber 1a, there is a film gate plate 21a having an aperature 21a₁ formed within the receiving chamber 1a. When the film cassette C1 or C2 shown in FIG. 1 is loaded into the cassette receiving chamber 1a, the film gate plate 21a (see FIG. 4) is covered by the exposure opening C1a of the cassette C1 or the exposure opening C2a of the cassette C2. Film F1 or F2 in the exposure opening C1a or C2a of the cassette C1 or C2 is disposed between the side walls 21a₂ and 21a₃ of the film gate plate 21a. Denoted by 22 is a film presence detecting piece extending through the bottom wall 23 of the cassette receiving chamber 1a and stretched within the receiving chamber 1a, one end 22a thereof is projectable from one side wall 21a₃ of the gate plate 21a toward the other side wall 21a₂, and the other end 22b being capable of bearing against a conductive piece 24 disposed on the back side of the bottom wall 23. The film presence detecting piece 22 is normally biased inwardly of the cassette receiving chamber 1a by an unshown spring and at least that portion of said other end 22b which bears against the conductive piece 24 is formed with a conductive material, and this other end 22b and the conductive piece 24 together form a switch SW9. When the film cassette C1 or C2 is loaded into the cassette-receiving chamber 1a and the film F1 or F2 is urged against the surface 21a of the film gate plate, one end 22a of the detecting piece 22 is forced toward the bottom wall 23 by the force with which the film is inserted between the side walls 21a₂ and 21a₃ of the film gate plate and the detecting piece 22 is displaced to a position indicated by dot-and-dash line in FIG. 4, so that the other end 22b is brought out of engagement with the conductive piece 24 to open the switch SW9. Conversely, when the film cassette C1 or C2 is not present in the cassette receiving chamber 1a, or if present, when the film F1 or F2 is not loaded on the side walls 21a₂ and 21a₃ in a predetermined condition, or when the film F1 or F2 is damaged by some trouble and comes to be absent between the side walls 21a₂ and 21a₃, then the detecting piece 22 is disposed at a position shown by solid line in FIG. 4, so that the end 22b of the detecting piece 22 bears against the conductive piece 24 to close the switch SW9. Thus, the switch SW9 performs the formation of detecting whether film F1 or F2 is present on the film gate plate 21a or whether they are properly set.

The film cassette C1 shown in FIG. 1A and the film cassette C2 shown in FIG. 1B may be alternatively loaded into the film-receiving chamber, and the position of FIG. 2C shows the film cassette C2 being loaded. When the film C1 is loaded, it is disposed at the position indicated by dot-and-dash line. Positioning of the film cassette C1 and the film cassette C2 in the film-receiving chamber 1a is accomplished by a position controlling member 24 projected from the bottom wall 23. In other words, when the film cassette C1 is loaded in the film-receiving chamber 1a, this cassette C1 is disposed above the position controlling member 24, and when the film cassette C2 is loaded, the (H₂−H₁) portion of the film cassette C2 escapes the position controlling member 24 with the film cassette C2 projected below the position controlling member 24.

The film cassette C1 has an exposure opening C1a adapted to be positioned at an image recording location (a second recording location) of the cassette-receiving chamber 1a corresponding to the gate plate 21 when the film cassette C1 is inserted in the cassette-receiving chamber 1a, and the silent film F1 contained in the film cassette C1 may be supplied from the supply reel of the film cassette C1 through the exposure opening C1a onto a take-up spool coaxial with the supply reel. Also, the film cassette C2 has an exposure opening C2a adapted to be positioned at the image recording location of the film-receiving chamber 1a corresponding to the gate plate 21a when the cassette C2 is loaded in the cassette-receiving chamber 1a, and a recording opening C2 be adapted to be positioned at the second recording location of the chamber 1a. The sound film F2 contained in the cassette C2 may be supplied from the supply spool in the cassette C2 through the exposure opening C2a and the recording opening C2b onto a take-up spool coaxial with the supply spool. The second film F2 has a strip of magnetic recording material along one side edge on one surface thereof. Designated by 25 is a pull-down claw adapted to intermittently engage in the perforation of the film F1 or F2 existing on the exposure opening C1a or C2b of the cassette C1 or C2 alternatively loaded in the cassette-receiving chamber 1a and to transport the film F1 or F2 downstream through the gate plate 21a formed at the second recording location of the chamber 1a. This claw member 25 is operated by a known means. Denoted by 26 is a pressure pad disposed in opposed relationship with a magnetic head 27 held by the position controlling member 24 with the film passage at the recording location of the chamber 1a being interposed therebetween. The pad 26 is for urging the film F2 against the magnetic head 27, the film F2 being at the recording opening C2b of the cassette C2 loaded in the chamber 1a, and the pad is normally biased toward the magnetic head 27 by a compression spring 35. Denoted by 28 is a capstan disposed at said recording location in said chamber 1a. The capstan 28 is supported on the camera body 1 for rotation and against axial sliding, and has a fly wheel 31 with a pulley 31a secured at the other end thereof. The capstan 28 is rotated at a substantially constant velocity by the drive of a constant speed motor Mc transmitted through an endless belt 30 stretched over and between a pulley Mc1 secured to the output shaft Mc1 or the motor Mc and the pulley 31a of the flywheel 31. Designated by 32 is a pinch roller forming film supply means for transporting the film F2 substantially at a constant velocity, the film F2 being at the recording opening C2b of the cassette C2 loaded in the chamber 1a. The pinch roller 32 is disposed in opposed relationship with the capstan with the film passageway at the recording location of the chamber 1a being interposed therebetween. Denoted by 33 is a loop detecting member for detecting the length of film between the film gate plate 21a and the magnetic head 27, the loop detecting member being adapted to contact the film F2 between the film plate 21a and the magnetic head 27. The loop detecting member 33 is pivotable about a shaft 33a supported on the camera body 1 and normally biased in a predetermined direction by a compression spring 34. SW3 is a normally closed switch whose opening and closing is controlled by the pivoting of the loop detecting member 33. The switch SW3 remains closed when the loop detecting member 33 is rotatively displaced clockwisely, and is forcibly opened by the loop detecting member 33 when this member is rotatively displaced counterclockwisely.

In the cine camera of the present embodiment, when the cassette C2 is loaded into the cassette receiving chamber 1a, the amount of film F2 per unit time intermittently transported from the exposure opening C2a toward the recording opening C2b by the film pull-down claw approximately equals the amount of film F2 per unit time transported at a constant velocity at the recording opening C2b. However, the length of film between the film gate plate 21a and the magnetic head is always variable. In other words, the film feed means including the capstan 28 and the pinch roller 32 transports the film F2 at a constant velocity, whereas the film feed means including the pull-down claw 25 transports the film F2 intermittently. Therefore, at an initial stage wherein the pull-down claw 25 has pulled down the film by an amount corresponding to one frame, the length of film between the gate plate 21a and the magnetic head 27 is greater than a predetermined length of film. Accordingly, the loop detecting member 33 in contact with the underside of the film F2 at the recording opening C2b of the cassette C2 is rotated counterclockwisely by the gravity of the film F2 and the reaction of the loop portion, thus opening the switch SW3. During the time from after the pull-down claw 25 has pulled down the film F2 by an amount corresponding to one frame until its starts the next pull-down, the film F2 between the film gate plate 21a and the magnetic head 27 is further transported downstream by the film feed means including the capstan 28 and the pinch roller 32. Thus, the amount of film between the gate plate 21a and the magnetic head 27 is gradually decreased and corresponding, the loop detecting member 33 is rotated clockwisely to close the switch SW3. Thus, the switch SW3 is repetitively opened and closed by the loop detecting member 33 each time the film F2 is pulled down by the pull-down claw 25.

The camera body 1 covered with the cover 17 which covers the opening of the film-receiving chamber 1a is provided with an opening 1c at a location which, when the cover 17 is closed, corresponds to a projection 17b provided on the cover 17, and a portion of a pinch roller moving device for effecting the resilient engagement and disengagement of the pinch roller 32 with the capstan 28 is projected through said opening 1c. The pinch roller moving device is formed by an electromagnet means PMg, displacement members 35, 36, spring 37, pivotable members 38, 39, sliding member 40, tension spring 41, etc. The pivotable member 39 is pivotable about a pin 42 secured to the camera body 1, as shown in FIG. 5. One arm 39a of the pivotable member 39 is provided with a projection $39a_1$ projectable through said opening 1c of the camera body 1, and the other arm 39b of the pivotable member 39 is provided with a cam $39b_1$ for controlling the sliding movement of the sliding member 40. The amount of displacement of the projection $39a_1$ in the direction in which it is projected through said opening 1c is controlled by the engagement between the portion $39a_2$ of the arm 39a and the edge portion of the opening 1c. The sliding member 40 is slidably mounted on a base plate 43 secured to the camera body 1 and the sliding movement thereof is controlled by a pin 43a studded on the base plate 43 and a slot 40a in the sliding member 40 engaged by the pin 43a. One end $40_1$ of the sliding member 40 is normally engaged with the cam 39b of the pivotable member 39, and an end $40b_1$ of a bent member 40b formed by bearing a portion of the sliding member 40 is engaged with said one arm 38a of the pivotable member 38 pivotable about a shaft 44 secured to the camera body 1. Said spring 41 extends betweena pin 43b studded on said base plate 43 and the arm 38a of said pivotable member 38. The spring 41 normally biases the pivotable member 38 counter-clockwisely. Thus, when the cover 17 is opened, the spring 41 displaces the pivotable member 38 counter-clockwisely, the sliding member 40 upwardly, and the pivotable member 39 clockwisely, as shown in FIG. 5, and the projection 39a of the pivotable member 39 is greatly projected from said opening 1c. Rotately extending through the other arm 38b of the pivotable member 38 is a pinch roller holding shaft 45 rotatably supported on the displacement member 35, and the displacement member 35 and the pivotable member 38 are linked together through the shaft 45. The pinch roller 32 is supported on said shaft 45. The displacement members 35 and 36, which contribute to displacement of the pinch roller 32, is rotatably supported on a shaft 46 secured to the camera body 1, and the spring 37 is disposed between the displacement members 35 and 36, the spring 37 normally biasing the displacement member 35 counter-clockwisely and the displacement 36 clockwisely. The displacements of the displacement members 35 and 36 in the opposite directions by the spring 37 is controlled by an engaging piece 35a of the displacement member 35 bending and engaging the underside of the displacement member 36. The electromagnet means PMg comprises an electromagnetic coil PCL1, a U-shaped core 47 partly extending through the magnetic coil PCL1, a pivotable member 49 pivotally supported on a shaft 48 secured to the camera body 1, and an iron piece 51 pivotally held by a shaft 50 supported on the pivotable member 49. The pivotable member 49 is normally biased counter-clockwisely by a tension spring 52, and the amount of counter clockwise rotative displacement of the pivotable member 49 is controlled by the engagement thereof with a pin 53 studded in the camera body 1. Designated by 54 is an adjust screw dispersed at the free end of the pivotable member 49.

Figure 3:
Figure 3B:
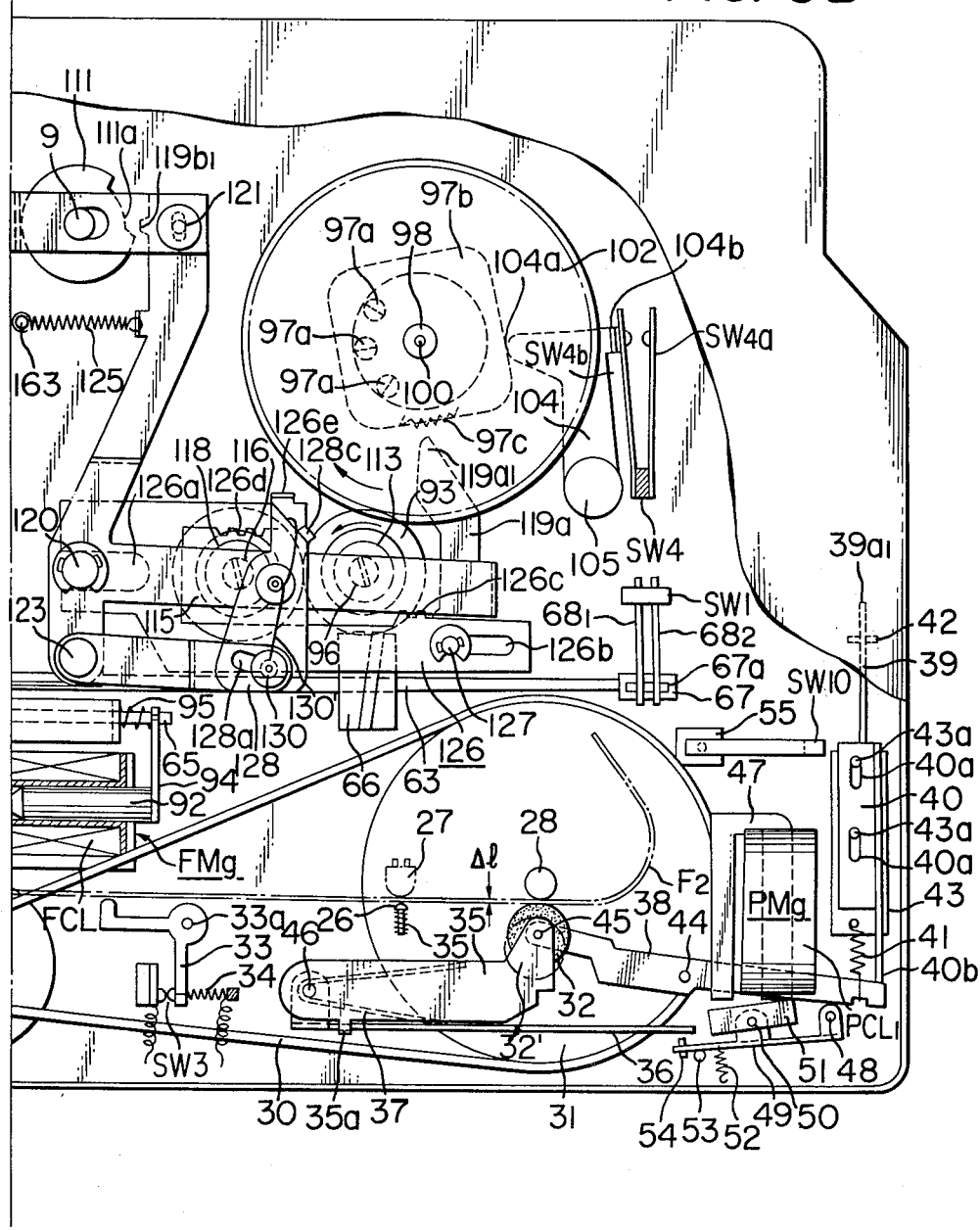
Figure 4:
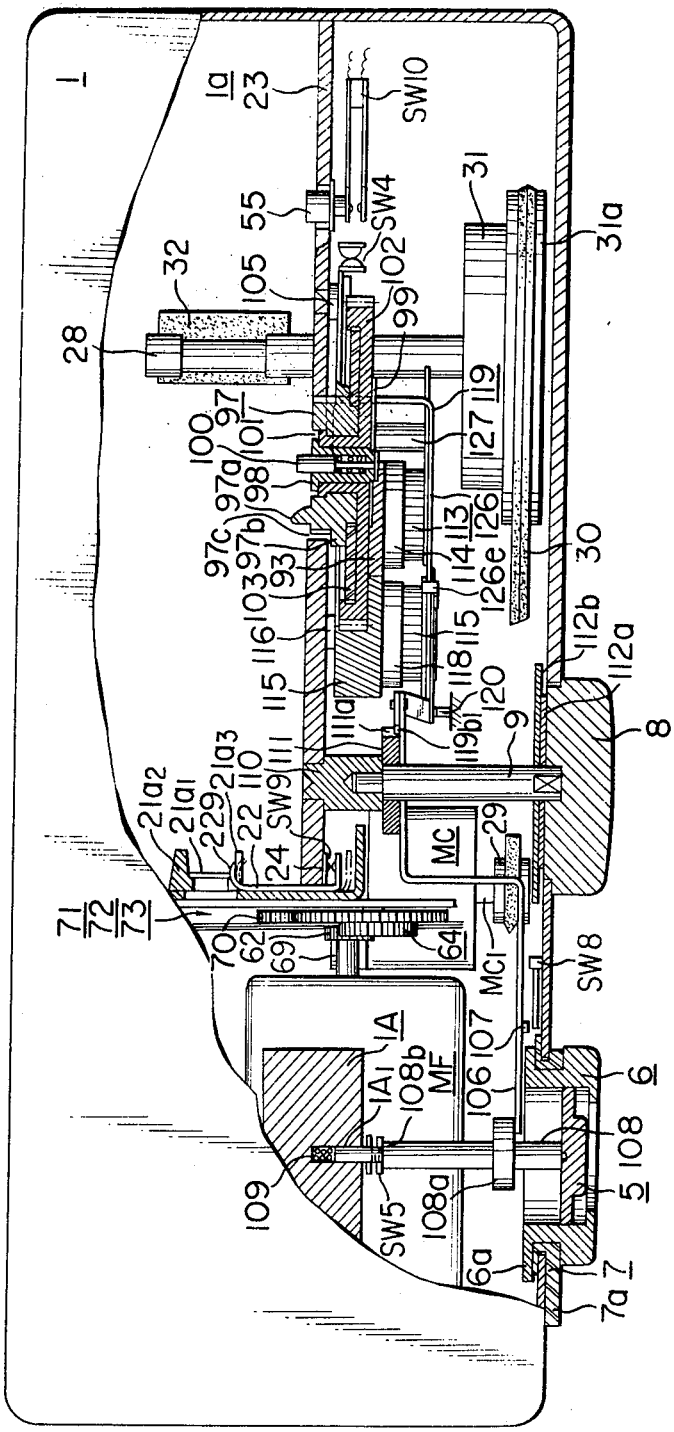
FIG. 4 is a cross-sectional view taken along the line IV—IV in FIG. 2A with the picture taking lens structure body 2, the eye cap 3 and some other members being removed.

Operation of the pinch roller moving device so constructed will now be described. When the cover 17 is open, the tension of the spring 41 displaces the pivotable member 38 counter-clockwisely, the sliding member 40 upwardly and the pivotable member 39 clockwisely, as shown in FIG. 5, thus causing the projection 39a of the pivotable member 39 to be greatly projected through the opening 1c of the camera body 1, and the counter-clockwise rotation of the pivotable member 39 rotates both the displacement members 35 and 36 clockwisely so that, as indicated by dot-and-dash line 32, the pinch roller 32 is disposed at its rest position much spaced apart from the capstan 28. When the cover 17 is closed, the projection $39a_1$ of the pivotable member 39 projected through the opening 1c of the camera body 1 is pushed by the projection 17b of the cover 17 so that the pivotable member 39 is pivotally displaced counter-clockwisely. When this occurs, the sliding member 40 engaged with the cam $39b_1$ of the pivotable member 39 is slidingly displaced toward the pivotable member 38 side by the action of the cam $39b_1$. Also, by the sliding displacement of the sliding member 40, the pivotable member 38 engaged with the end $40b_1$ of the bend 40b of the sliding member 40 is pivoted clockwisely against the force of the spring 41 while, at the same time, the displacement members 35 and 36 linked together by the pivotable member 38 and the shaft 45 are pivotal counter-clockwisely to bring the pinch roller 32 to its preparatory position as shown by solid line in FIG. 3. In this state, however, the pinch roller 32 is not resiliently urged against the capstan 28. Therefore, the sound film F2 disposed between the pinch roller 32 and the capstan 28 is ready to be pulled out, if desired, from between the pinch roller 32 and the capstan 28. That is, when the front cover 17 is closed, the pinch roller 32 is brought to said preparatory position closely adjacent to the capstan 28 from said rest position much spaced apart with respect to the capstan 28. Displacement of the pinch roller from such preparatory position to the operative position in which the pinch roller is in resilient contact with the capstan is accomplished by the aforementioned electromagnet means PMg. More particularly, in the condition in which the pinch roller 32 is disposed at its preparatory position as shown in FIG. 3, when a current is supplied to the electromagnetic coil PCL1 by means to be described, the electromagnetic coil PCL1 is excited to magnetize the core 47. Upon magnetization of this core 47, the iron piece 51 is attracted by the core 47 and the pivotable member 49 with the core 47 is pivotally displaced counter-clockwisely against the bias of the spring 52. Where the pivotable member 49 is rotated clockwisely, the adjust screw 54 on the pivotable member 49 is engaged with the free end of the displacement member 36, the thereby rotate the displacement member 36 clockwisely. This clockwise rotation of the displacement member 36 is transmitted to the displacement member 37 through the spring 37 to rotate the displacement member 35 counter-clockwisely and rotate the pivotable member 38 clockwisely against the bias of the spring 41. Such rotative displacement of the displacement member 35 and the pivotable member 38 brings the pinch roller 32 to its operative position in which the pinch roller is in resilient engagement with the capstan 28. When the pinch roller 32 has been brought to the aforementioned operative position, the film F2 is firmly nipped between the pinch roller 32 and the capstan 28. The contact pressure with which the pinch roller 32 resiliently contacts the capstan 28 is provided by the charge of the spring 37, and the magnitude of this spring charge may be finely adjusted by turning the adjust screw 54 provided on the pivotable member 49 to adjust the amount of projection of the adjust screw 54 from the pivotable member 49 toward the displacement member 36 side. The return of the pinch roller 32 from its operative position to its preparatory position is accomplished by cutting off the current supply to the electromagnetic coil PCL1 of the electromagnetic means PMg. More particularly, when the current supply to the electromagnetic coil PCL1 is cut off, the electromagnetic coil PCL1 is deenergized to release the core 47 from the iron piece 51, so that the pivotable member 49 is rotatively displaced counter-clockwisely by the bias of the spring 52 until it bears against the pin 53. Along therewith, the pivotable member 38 is rotated counter-clockwisely by the bias of the spring 41 until it bears against the bend 40b of the sliding plate 40 and at the same time, the displacement members 35 and 36 are rotatively displaced clockwisely, thereby returning the pinch roller 32 from its operative position to its preparatory position. Further, return of the pinch roller 32 from its preparatory position to its rest position is accomplished by opening the cover 17. More particularly, when the cover 17 is opened, the pressure force with which the projection 17b of the cover 17 has pressed the projection $39a_1$ of the pivotable member 39 is released so that the pivotable member 39 is subjected to the bias of the spring 41 through the pivotable member 38 and the sliding member 40 and rotated until it is controlled by the $39a_2$ of the pivotable member 39 and the edge of the opening 1c of the camera body 1. By the clockwise rotation of the pivotable member 39, the sliding plate 40 is displaced toward the pivotable member 39 side by the bias of the spring 41 under the control of the cam 39b of the pivotable member 39, as shown in FIG. 5, and at the same time, the pivotable member 38 is further rotated counter-clockwisely with a result that the capstan 32 returns to its rest position as indicated by dot-and-dash line 32' in FIG. 3. Although not shown, the pinch roller moving device, the pad 26 and the loop detecting member 33 are mechanically associated with one another so that when the pinch roller 32 is at its rest position, the loop detecting member 33 is brought to a position in which it is out of engagement with the film F2 and the pad 26 is brought to a position spaced apart from the magnetic head 27. Conversely, in response to displacement of the pinch roller 32 from its rest position to its preparatory position, the loop detecting member 33 and the pad 26 are controlled so that the loop detecting member 33 is permitted to contact the film F2 and the pad 26 is urged against the magnetic head 27.

A cassette type detecting member 55 shown within the cassette-receiving chamber 1a is projected into the chamber 1a through the bottom wall 23 thereof. The bias force with which the detecting member 55 is projected into the chamber 1a is provided by the contact of a normally open switch SW10 bearing against the other end of the detecting member 55. The location whereat the detecting member 55 is projected into the chamber 1a is not covered by the cassette C1 when the silent film cassette C1 is loaded in the chamber 1a, but is covered by the cassette C2 when the sound film cassette C2 is loaded in the chamber 1a. The switch SW10 is closed by the force of the detecting member 55 when the cassette C2 is loaded into the chamber 1a to displace the detecting member 55 outwardly of the chamber 1a.

The aforementioned trigger button 16 is secured to a trigger plate 56 having a slot 56 engaged by a pin 57 secured to the camera body 1. By a compression spring 58, the trigger plate 56 is biased so that the trigger button 16 is always projected outwardly of the camera body, and when the trigger button 16 is depressed by the operator's finger against the bias of the spring 58, the trigger plate 56 is slidingly displaced by the guide of the slot 56a and the pin 57. When the trigger plate 56 is displaced rightwardly, the stepped portion 56b of the trigger plate 56 first bears against a normally open switch SWE to close this switch and then, while leaning the switch SWE closed, the end 56$b_2$ bears against a normally open switch SW2 to close the same. When the trigger button 16 is released, the trigger button 16 and the trigger plate 56 are slidingly returned leftwardly, in FIG. 3, by the bias of the spring 58 and at this time, the switch SW2 is first opened, and then the switch SWE is opened. Thus, the trigger button 16, the trigger plate 56, the switches SWE and SW2, and the spring 58 together constitute a two-stage trigger device.

Figure 6B:
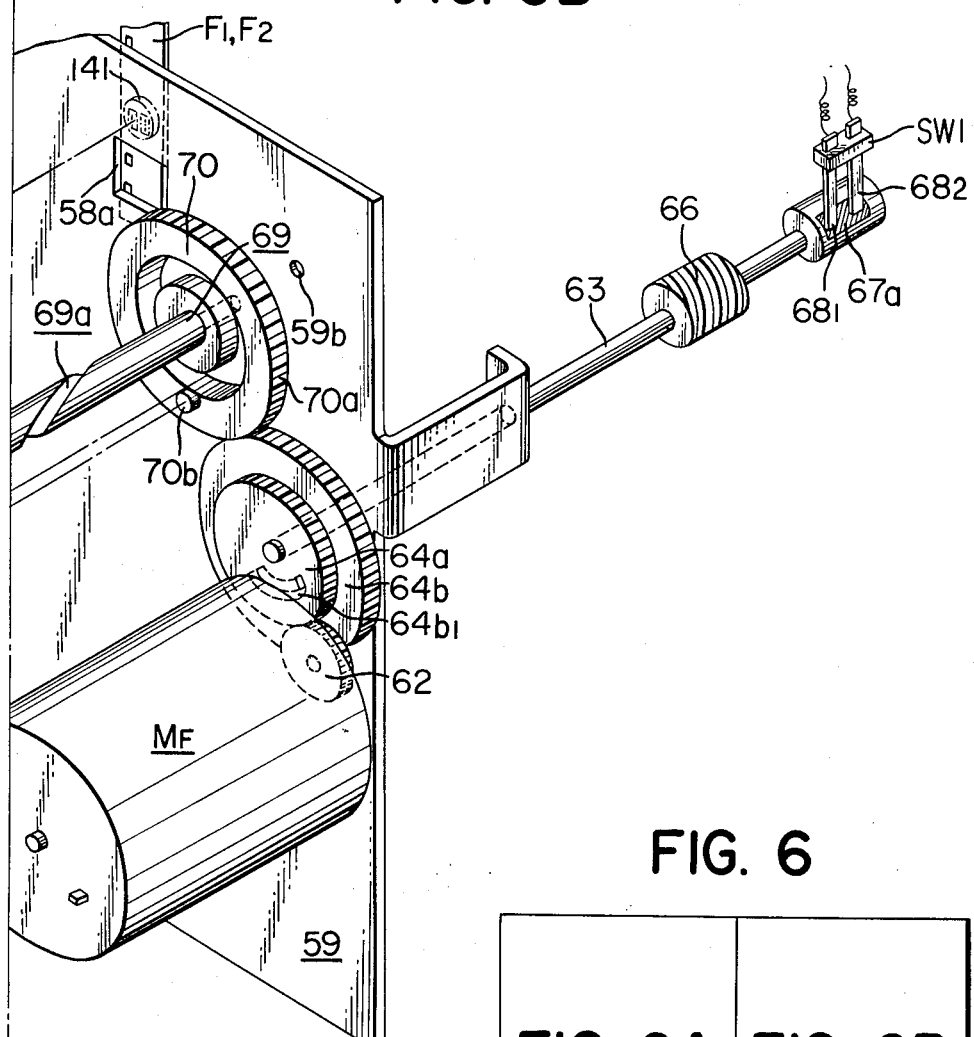
FIGS. 6, 6A, and 6B is an exploded perspective view of the shutter driving mechanism and shutter opening varying mechanism shown in FIG. 3.
Figure 6:
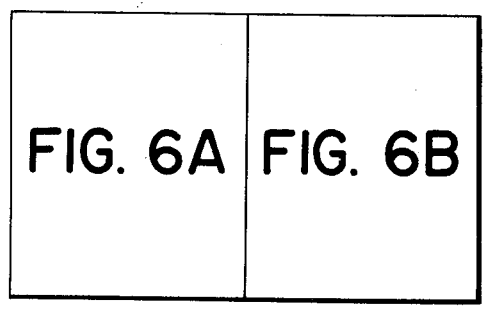
Figure 6A:
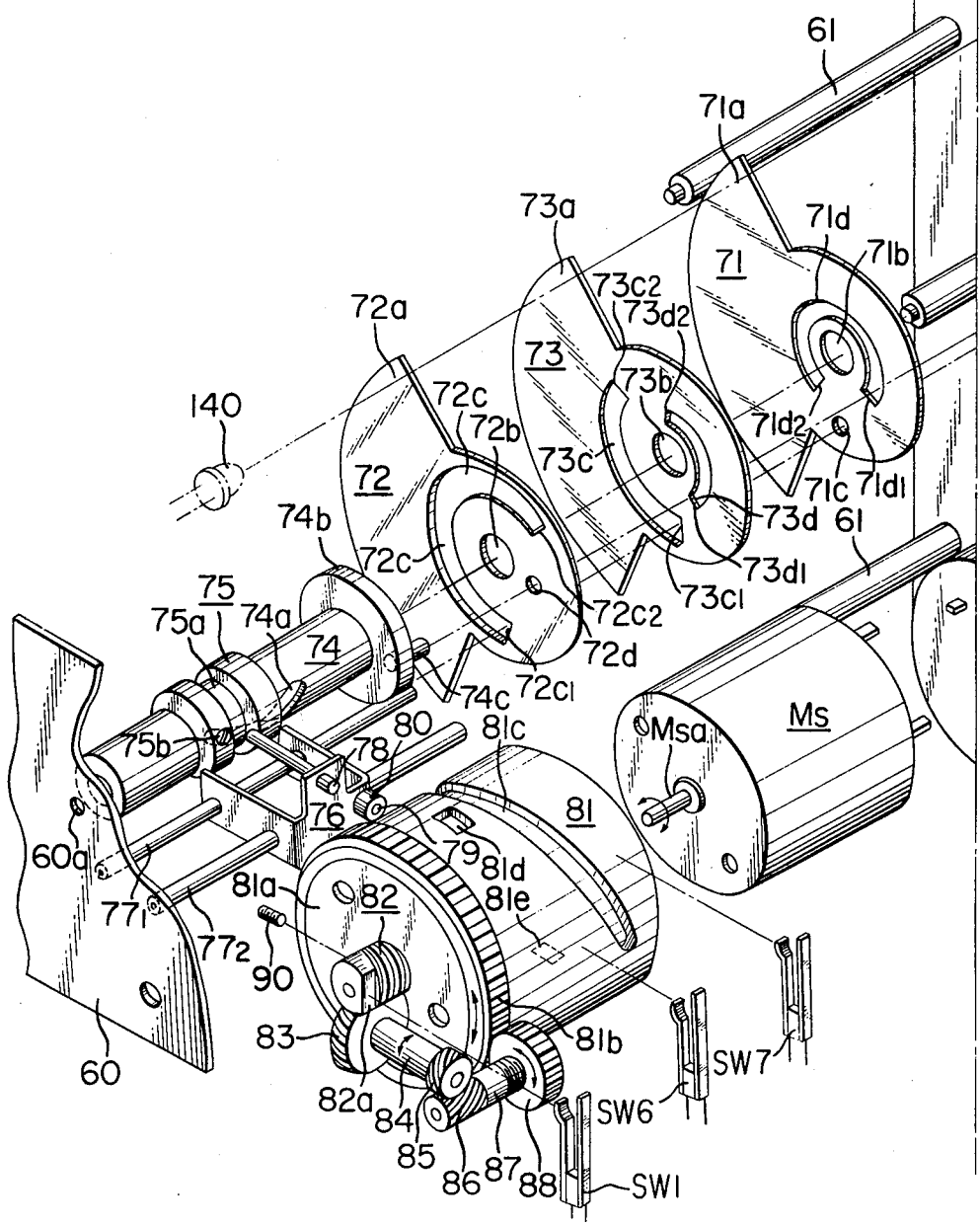
Figure 7:
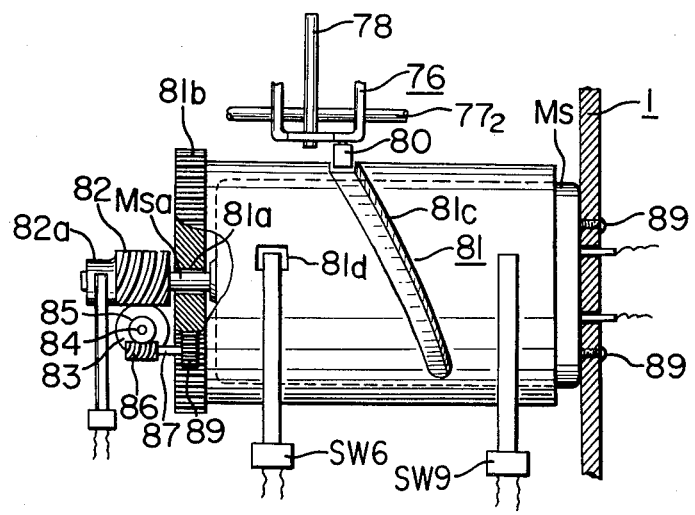
FIG. 7 is a detailed view of the driving part for the shutter opening varying mechanism shown in FIGS. 3 and 6.
Figure 8:
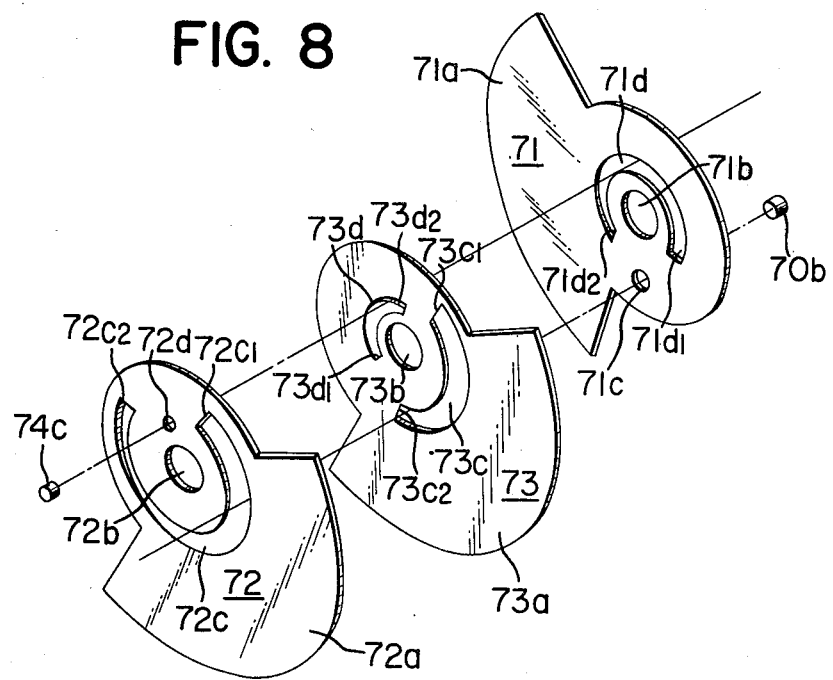
FIGS. 8 through 12 show various steps of opening of the shutter blades controlled by the shutter opening varying mechanism shown in FIGS. 3 and 6.
Figure 9:
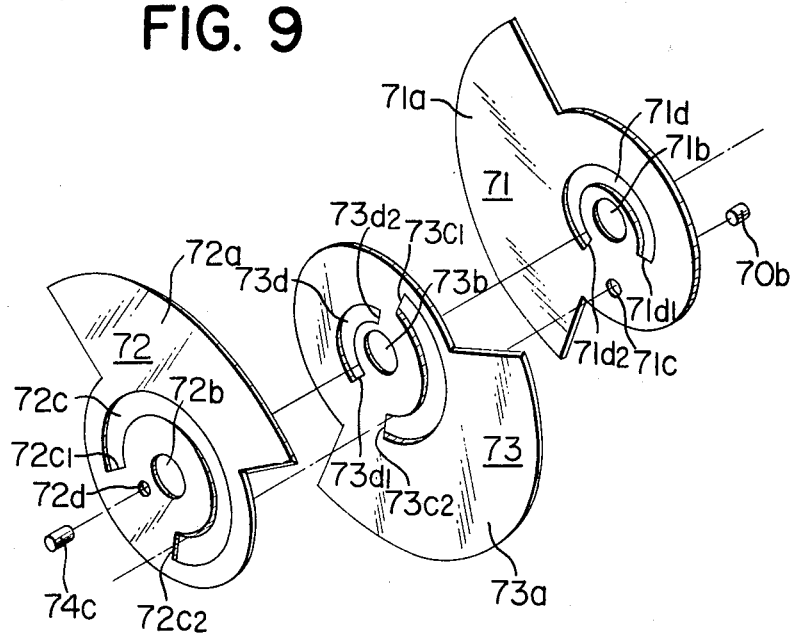
Figure 10:
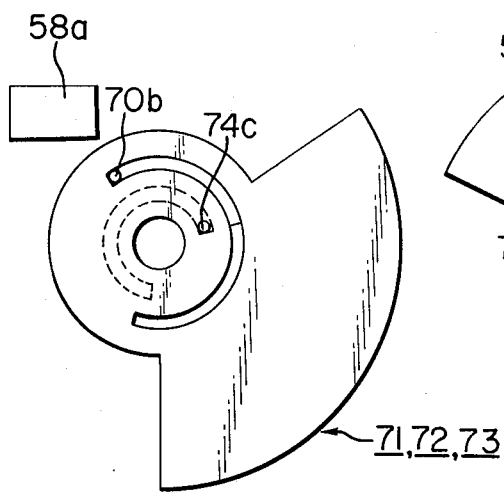
Figure 11:
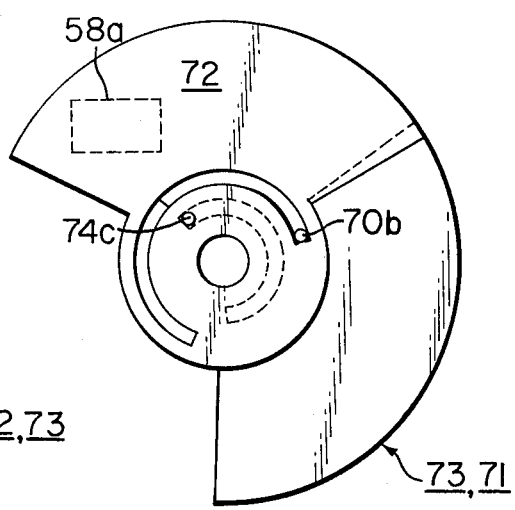
Figure 12:
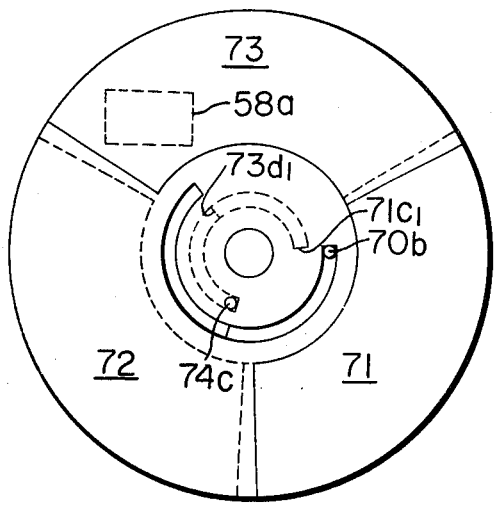

Designated by 58 is a first base plate having a portion thereof serving also as the front wall of the cassette-receiving chamber 1a. The base plate 58 is secured to the camera body and has an aperture 58a at a location corresponding to the aperture 21a of the film gate plate 21. Denoted by 59 is a second base plate disposed in opposed relationship with the first base plate 58. The first 58 and the second base plate 59 are secured to each other in a predetermined spaced apart relationship by a plurality of spacer bars 61 each having one end secured to the first base plate 58 and the other end secured to the second base plate 59. MF is a reversible motor secured to the camera body 62. The driver output of the motor MF is used to operate a rotatable shutter to be described, a film take-up driving mechanism, an overlap mechanism, and an intermittent film feeding mechanism for driving the aforementioned pull-down claw 25. Designated by 62 is a gear operatively secured to the output shaft MF1 of the motor MF through a known slip mechanism. Denoted by 63 is a rotary shaft extending through the first base plate 59 and rotatably journalled to the base plate 59. On one end of the rotary shaft 63 extending from the first base plate 59 toward the motor MF side, there is secured a gear 64 comprising a first gear portion 64a and a second gear portion 64b. The gear 64 is formed with a blocking recess 64b at a portion thereof opposed to the first base plate 59 and in which the end of a stop member 65, to be described, is received to restrain the gear. The first gear portion 64a of the gear 64 is always in mesh engagement with the gear 62. On the other end of the rotary shaft extending from the first base plate 59 in the direction opposite to the motor MF, there are secured a worm gear 66 and a cylindrical drum 67. A conductive piece 67a is provided on a portion of the peripheral surface of the cylindrical drum 67. Two conductive pieces $68_1$ and $68_2$ are urged against the peripheral surface of the cylindrical drum 67. These conductive pieces $68_1$ and $68_2$ are electrically connected through said conductive piece 67a when in conductive piece 67a on the cylindrical drum 67 rotating with the rotary shaft 63 comes to a location whereat it contacts both of the conductive pieces $68_1$ and $68_2$. The conductive pieces $68_1$, $68_2$ and the drum 67 together constitute a switch SW1. Denoted by 69 is a main shutter shaft having one end engaged in the aperture 59b of the first base plate 59 and the other end engaged in the aperture 60a of the second base plate 60, the main shutter shaft 69 being rotatably supported by the first 59 and the second base plate 60. The main shutter shaft 69 is formed with a spiral groove 69a. Denoted by 70 is a gear secured on the main shutter shaft 69. A ring-shaped groove 70a and a pin 70b projected toward the second base plate 60 are formed on the side of the gear 70 which is opposed to the second base plate 60. The gear 70 is always in mesh-engagement with the second gear portion 64b of the gear 64, and the gear 70 and the second gear portion 64b are of substantially the same diameter and have the same number of teeth. The rotary shaft 63 and the main shutter shaft 69 rotated by the drive of the motor MF are rotated substantially at a ratio of 1:1. Although not shown, the gear 70 is always in mesh-engagement with a gear for transmitting the drive of the motor MF to the known intermittent film feeding mechanism which causes the pull-down claw 25 to transport the film F1 or F2 intermittently one by one frame on the film gate plate 21. The intermittent film feeding mechanism is also associated so that the pull-down claw transports the film F1 or F2 by one frame while the gear 70 makes one full rotation. Designated by 71, 72 and 73 are shutter blades having sector shutter portions 71a, 72a and 73a, respectively. The shutter blade 71 is used as a main shutter blade, the shutter blade 72 is used as a first auxiliary shutter blade, and the shutter blade 73 is used as a second auxiliary shutter blade. The angles of the arcs of the shutter portions 71a, 72a and 73a of the shutter blades 71, 72 and 73, respectively, are slightly greater than 120°. The shutter blades 71, 72 and 73 are formed with center holes 71b, 72b and 73b, respectively. If an imaginary first circle having a radius "D" and an imaginary second circle having a radius "d" are described on the surface of each shutter blade 71, 72 and 73 with the center holes 71b, 72b and 73b as the center, an aperture 71c is formed on the circumference of the first circle on the main shutter blade 71, a slot 71d complementary with the circumference of the second circle is formed on the circumference of the second circle, a slot 72c complementary with the first circumference of the first auxiliary shutter blade 72 is formed on such circumference, an aperture 72d is formed on the circumference of the second circle, a slot 73c complementary with the first circumference of the second auxiliary shutter blade 73 is formed on such circumference, and a slot 73d complementary with the circumference of the second circle is formed on such circumference. The pin 70b on the gear 70 extends through the aperture 71c of the main shutter blade 71, the slot 73c of the second auxiliary shutter blade 73, and the slot 72c of the first auxiliary shutter blade 72. The main shutter blade 71 is in a fixed relationship with the gear 70 by the engagement between the aperture 71c and the pin 70b, while the other auxiliary shutter blades 72 and 73 are loosely fitted by the slots 72c and 73c. Designated by 74 is a cylindrical auxiliary shutter shaft disposed over the main shutter shaft 69. The auxiliary shutter shaft 74 is rotatable with respect to the main shutter shaft 69 but is not slidable axially. The auxiliary shutter shaft 74 is formed with a spiral groove 74a inclined in the opposite direction to the spiral groove 69a on the main shutter shaft 69, and also provided with a flanged portion 74b on that end thereof which is opposed to the first base plate 59. On the surface of the flanged portion 74b which is opposed to the second base plate 59, there is provided a pin 74c extending toward the second base plate 59. The pin 74c extends into the groove 70a of the gear 70 through the aperture 72d in the first auxiliary shutter blade 72 disposed between the flanged portion 74b of the auxiliary shutter shaft 74 and the gear 70, the slot 73d in the second auxiliary shutter blade 73, and the slot 71d in the main shutter blade 71. Designated by 75 is a shutter opening angle adjust cylinder slidable and rotatable with respect to the auxiliary shutter shaft 74 and disposed over the auxiliary shutter shaft 74. The peripheral surface of the adjusting cylinder 75 is formed with an endless groove 75a. Also, the adjusting cylinder 75 is provided with a pin 75b projectedly studded inwardly thereof. The pin 75b extends through the spiral groove 74a of the auxiliary shutter shaft 74 and is engaged with the spiral groove 69a of the main shutter shaft 69. By this pin 75b, the adjusting cylinder 75, the main shutter shaft 69 and the auxiliary shutter shaft 74 are operatively engaged for rotation together. This adjusting cylinder 75, when slid on the auxiliary shutter shaft 74 by means to be described, rotates the main shutter shaft 69 and the auxiliary shutter shaft 74 in the opposite directions with the aid of the engagement between the pin 75b and the spiral grooves 74a, 69a. Designated by 76 is a sliding member slidably held by a pair of guide bars 77₁ and 77₂ secured between the first base plate 59 and the second base plate 60. The guide bars 77₁ and 77₂ extend substantially parallel to the main shutter shaft 69. Denoted by 78 is a pin secured on the sliding member 76. The free end of the pin 78 is loosely engaged in the endless groove 75a of the adjusting cylinder 75. Thus, when the sliding member 76 is slid by being guided by the guide bars 77₁ and 77₂, the pin 78 causes the adjusting cylinder 75 to slide together on the auxiliary shutter shaft 74, but the pin affects in no way the rotation of the adjusting cylinder 75 when the latter is rotated with the main shutter shaft 69 and the auxiliary shutter shaft 74. Denoted by 79 is a shaft extending in the opposite direction to the adjusting cylinder and secured to the sliding member 76, and 80 a rotatable ring rotatably disposed on the shaft 79. Ms is a shutter opening angle regulating motor secured to the camera body 1 by means of screws 89. Denoted by 81 is a drug cup-shaped cam ring formed so as to fully cover the motor Ms leaving an end face thereof, as shown in FIG. 7. In the buttom wall of the cam ring 81, three is provided a through-hole 81a through which the output shaft of the motor Ms, and a gear portion 81b is provided on the end of the peripheral surface thereof adjacent to the buttom wall. In the peripheral surface of the cam ring 81, there are provided a cam groove 81c in which the rotatable ring 80 is loosely fitted, a switch control recess 81d for effecting the opening of a switch SW6, and a control recess 81c for effecting the opening of a switch SW9. The cam ring 81 itself is freely rotatable with respect to the motor Ms. Designated by 82 is a worm gear fitted on the output shaft Msa of the motor Ms extending through the hole 81a of the cam ring 81 and projected outwardly of the cam ring 81, the worm gear 82 being firmly secured to the output shaft by means of set screws 90. The worm gear 82 is provided with a switch control cam 82a for controlling ON-OFF of a switch SW11 for each full rotation of the output shaft MSa of the motor Ms. Denoted by 83 is a worm wheel secured to a shaft 84 rotatably journalled to the camera body 1, and 85 a helical gear secured to the shaft 84. The worm wheel 83 is always in mesh-engagement with the worm gear 82. Denoted by 86 is a helical gear secured to a shft 87 rotatably journalled to the camera body 1, and 89 a gear operatively coupled to the shaft 87 through a friction mechanism 90. The gear 86 is always in mesh-engagement with the gear 84, and also the gear 89 is always in mesh-engagement with the gear portion 81b of the cam ring 81. The gears 82, 83, 84, 86, 89, 81b and the rotary shafts 84 and 87 together constitute a reduction mechanism. The drive output of the motor 81 may be transmitted through the reduction mechanism to the cam ring 81 to rotate this cam ring on the peripheral surface of the motor Ms. The mechanism so constructed to rotate the cam ring 81 by the drive of the motor Ms can very much shorten the axial length of the shutter opening angle varying mechanism. The rotative displacement of the cam ring 81 rotated by the drive of the motor Ms as described above controls the angle of opening of the shutter formed by the shutter blades 71, 72 and 73. More particularly, the main shutter blade 71 is secured to the gear 70 through the pin 70b and the first auxiliary shutter blade 72 is secured to the auxiliary shutter shaft 74 through the pin 74c, but the second auxiliary shutter blade 73 is not secured to the auxiliary shutter shaft 74 nor to the main shutter shaft 69. When one of switches SW6 comprising a pair of conductive pieces normally closed by bearing against the outer periphery of the cam ring 81 drops in the recess 81d on the cam ring 81, as shown in FIG. 7, to open the switch SW6, the sliding member 76 is displaced to its leftmost position. In this state, as shown in FIGS. 6 and 9, the pin 70b is engaged with the main shutter blade 71 and bears against one end 73c₁ of the sot 73c in the second auxiliary shutter blade 73 and one end 72c₁ of the slot 72c in the first auxiliary shutter blade 72, and the pin 74c is engaged with the aperture 72d in the first auxiliary shutter blade 72 and bears against one end 73d₁ of the sot 73d in the second auxiliary shutter blade 73 and one end 71d₁ of the slot 71d in the main shutter blade 71. That is, in this state, the three shutter blades 71, 72 and 73 are completely overlapped and the shutter opeing angle thereof is about 240°, which is the fully open angle. As the motor Ms is rotated by a means to be described and the cam ring 81 is rotated counter-clockwisely in FIG. 6, said one conductive piece drops in the recess 81d on the cam ring 81 to open the swtich SW1 and said one conductive piece now comes out of the recess 81d and is urged against the peripheral surface of the cam ring 81, thus closing the switch SW1. At the same time, the sliding member 76 is gradually displaced toward the first base plate 59 under the control of the cam groove 81c on the cam ring 81. Consequently, the adjusting cylinder 75 is also slid on the auxiliary shutter shaft 74 toward the first base plate 59. When the adjusting cylinder 75 is displaced toward the first base plate 59, the auxiliary shutter shaft 74 starts moving counter-clockwisely in FIG. 6 with respect to the main shutter shaft 69 by the engagement between the pin 75b of the adjusting cylinder 75 and the spiral groove of the auxiliary shutter shaft 74 and the spiral groove 69a of the main shutter shaft 69. By this, the first auxiliary shutter blade 72 is individually rotated counter-clockwisely with respect to the second auxiliary shutter shaft 73 and the main shutter shaft 71, thus gradually narrowing the shutter opening angle. The auxiliary shutter shaft 74 is rotated through about 120° and the pin 74c of the auxiliary shutter shaft 74 comes to a position in which it bears against the other end of the slot 73d in the second auxiliary shutter blade 73 (see FIGS. 8 and 11), and when the auxiliary shutter shaft 74 is further rotated counter-clockwisely, the second auxiliary shutter blade 73 is pulled on by the pin 74c so that the first 72 and the second auxiliary shutter blade 73 are rotated with respect to the main shutter blade 71, thus further narrowing the shutter opening angle. The auxiliary shutter shaft 74 is rotated through about 240° and at least, when the other end 72c$_2$ of the slot 72c in the first auxiliary shutter blade 72 and the other end of the slot 73c of the second auxiliary shutter blade 73 come to bear against the pin 70b on the gear 70, the shutter becomes fully closed as shown in FIGS. 9 and 12. In this state, the adjusting cylinder 75 comes to assure a position nearest the first base plate 59. Accordingly, one of the contacts of the switch SW7 normally in contact with the cam ring 81 and being closed drops in the recess 81c of the cam ring 81 to close the switch SW7, which puts out a single meaning that the shutter has become fully closed. This completes the fade-out operation. In order for fade-in operation to be performed, the motor Ms is caused to rotate reversely. More particularly, upon fully closing of the shutter, the cam ring 81 is rotatively displaced to the extremity of counter-clockwise rotation and the adjusting cylinder 75 is slidingly displaced most toward the first base plate 59 and in this state, the cam ring 81 is rotated clockwisely by the reverse rotation of the motor Ms, whereupon the contact of the switch Sw7 dropped in the recess 81c of the cam ring 81 comes out of such recess 81c, thus closing the switch SW7 again. When the cam ring 81 is rotated clockwisely, the sliding member 76 is gradually displaced toward the second base plate 60 under the control of the cam groove 81c on the cam ring 81. Consequently, the adjusting cylinder 75 also slides on the auxiliary shutter shaft 74 toward the second base plate 60 but, when the adjusting cylinder 75 slides toward the second base plate 60, the auxiliary shutter shaft 74 is rotatively displaced clockwisely with respect to the main shutter shaft 69. When the auxiliary shutter shaft 74 is rotated clockwisely, the first auxiliary shutter blade 72 is gradually rotated clockwisely with respect to the second auxiliary shutter blade 73 and the main shutter blade 72, thus widening the shutter opening angle. When the auxiliary shutter shaft 74 is returned through about 120°, the pin 74c of the shaft 74 comes to a position in which it bears against the other end 73d$_1$ of the slot 73d in the second auxiliary shutter blade 73. As the auxiliary shutter shaft 74 is further rotated clockwisely, the pin 74c pulls on the second auxiliary blade 73 so that the first 72 and the second auxiliary shutter blade 73 are rotated with respect to the main shutter blade 71, thus further widening the opening angle of the shutter. When the auxiliary shutter shaft 74 returns to about 240°, as shown in FIGS. 6 and 10, the main shutter blade 71, the first auxiliary shutter blade 72 and the second auxiliary shutter blade 73 becomes fully opened. This completes the fade-in operation.

The electromagnetic device FMg, secured to the first base plate 59, is provided to stop the operation of the intermittent film feeding device, the shutter device, etc. and comprises an electromagnetic coil FCL. core 91, round iron bar 92, stop member 65, connector piece 94 and spring 95. The magnetic coil FCL is cylindrically turned, and held on the first base plate 59 with an insulator interposed therebetween. The iron bar 92 is slidably disposed within the cylindrically shaped electromagnetic coil FCL. The stop member 65 is held on the first base plate 59 at a location engageable with the blocking recess 64b of the gear 64 and in a condition in which it is slidable perpendicularly with respect to the side surface of the gear 64. One end of the iron bar 92 and the stop memeber 65 are coupled together by the connector piece 94 so as to slide together, and are biased away from the first base plate 59 by a spring 95, when they are displaced away from the first base plate 59, the stop member 65 is not engageable with the blocking recess of the gear 64: When a current is supplied to the electromagnetic coil FCL of the electromagnet device MFg to energize the coil FCL and magnetize the core 91, the iron bar 92 is attracted to the core 91, whereby the stop member 65 is urged against the side of the rotating gear 64 against the bias of the spring 95. In this state, when the blocking recess 64b of the gear 64 comes to a position corresponding to the stop member 65, this stop member 65 is restrained in the recess 64b of the gear 64, thus forcibly blocking in rotation of the gear 64. That is, by this stoppage of the rotation of the gear 64, the operation of the intermittent film feeding mechanism is stopped and the rotation of the shutter and rotary shaft 63 is also stopped. When the current supply to the electromagnetic coil FCL is cut off, the stop member 65 and the iron bar 92 are again biased away from the first base plate 59 by the force of the spring 95, thus permitting rotation of the gear 64.

Designated by 93 is a gear rotatably supported on a fixed shaft secured to the main body 1. The gear 93 is always in mesh-engagement with the worm gear 65. Denoted by 97 is a substantially annular take-up shaft having a plurality of pawls engaged by the take-up shaft of the cassette C1 or C2 when one of these cassettes is loaded into the film-receiving chamber 1a. The take-up shaft 97 has a portion thereof projected into the chamber 1a through the opening in the bottom wall 23 of the chamber 1a, and in the outer peripheral portion disposed at the back side of the bottom wall 23, a substantially rectangular cam portion 97b and a gear portion 97c are integurally formed as shown in FIG. 3. 98 denotes a cylindrical member securely held by a base plate 99 secured to the camera body 1. Disposed in the cylindrical member 98 are a slidable pin 100 and a compression spring 101 normally biasing the pin 100 inwardly of the chamber 1a. The function of the pin 100 and spring 101 is fully described in U.S. Pat. No. 3,860,195, which shows that when a known sound film cassette C2 having a releasable anti-reverse rotation mechanism is loaded, they release the anti-reverse rotation mechanism and that when a known silent film cassette C1 having an unreleasable anti-reverse rotation mechanism is loaded, the pin 100 escapes from the chamber 1a. Designated by 101 is a gear having a portion thereof disposed between the inner peripheral surface of the take-up shaft 97 and the outer peripheral surface of the cylindrical member 98, and rotatably supported by the cylindrical member 98. The take-up 87 is rotatably mounted on the gear 102. The gear 102 is always in mesh-engagement with gear 93, and the drive of the gear 102 is transmitted to the take-up shaft 97 through a friction member 103 disposed between the gear 102 and the take-up shaft 97. Numeral 104 denotes a cam follower plate pivotally supported on a shaft 105 secured to the bottom wall 23. The cam follower 104 has a cam follower portion 104a normally bearing against the cam portion 97b on the take-up shaft 97 and an engaging portion 104b engaged with one contact of a normally open switch SW4 comprising electrical contacts SW4a and SW4b. The cam follower plate 104 is so biased by the electrical contact SW4b of the switch SW4 that the cam follower portion 104a bears against the cam portion 97b of the take-up shaft 97. When the take-up shaft 97 is rotated, the cam follower plate 104 is rotated clockwisely in FIG. 3 each time the top of the cam portion 92b comes to a position corresponding to the cam follower 104a of the cam follower plate 104, thus bringing the electrical contact SW4b into contact with the electrical contact SW4a. Accordingly, in the present embodiment, the switch SW4 repeats its opening-closing operation four times during one full rotation of the take-up shaft 97. The switch SW4 is used as a film feed signal. That is, when the exposure of the film F1 or F2 in the film cassette C1 or C2 loaded in the chamber 1a is all completed and the take-up shaft C1c or C2c of the film cassette becomes unrotatable, the take-up shaft 97 also becomes unrotatable and the rotation of the gear 102 is absorbed by the friction member 103. Thus, when the take-up shaft 97 is stopped, the switch SW4 does not repeat its opening-closing and this signal information is applied as input to means to be describe.

Designated by 113 is a gear rotatably supported on the shaft 96 on which the gear 93 is also rotatably supported. The gears 113 and 93 are operatively coupled through a known one-way clutch mechanism 114. The one-way clutch mechanism 114 transmits the rotation of the gear 93 to the gear 113 when the gear 93 is rotated counter-clockwisely, and causes slipping between the gear 93 and the clutch mechanism 114 when the gear 93 is rotated clockwisely, so as not to transmit the rotation of the gear 93 to the gear 113. Denoted by 115 is a gear rotatably supported on a fixed shaft 116 secured to the bottom wall 23. The gear 115 is always the mesh-engagement with the gear 93. Numeral 117 designates a gear rotatably supported on said fixed shaft 116. The gears 115 and 117 are operatively coupled together through a known one-way clutch mechanism 118. The one-way clutch mechanism 118 transmits the rotation of the gear 115 to the gear 117 when the gear 115 is rotated counter-clockwisely, but causes slipping between the gear 115 and the clutch mechanism 118 when the gear 115 is rotated clockwisely, so as not to transmit the rotation of the gear 115 to the gear 117. 119 denotes a pivotable member pivotally supported on a shaft 120 secured to the camera body 1. The pivotable member 119 has a restraining arm portion 119a having a restraining pawl 119a₁ engageable with the gear portion 97c of the take-up shaft 97, when the pivotable member 119 is pivoted counter-clockwisely, to thereby temporally stop the rotation of the take-up shaft 97 and disengageable with the gear portion 97c when the pivotable member is pivotal clockwisely, a link arm portion 119b linked to one end of the sliding member 106 through a pin 121, and a holding arm portion 119c for securely holding a fixed member 122 through a pin 123. The pivotable member 119 is normally biased counter-clockwise by a tension spring 125 engaged with a pin 124 having one end studded in the link arm portion 119b and the other end studded in the camera body 1. The linking of the link arm portion 119b of the pivotable member 119 to the sliding lever 106 is accomplished by the engagement of a pin 121 extending through the slot 106d of the sliding lever 106 and studded in the link arm portion 119b of the pivotable member 119. The link arm portion 119b is provided with an engaging portion 119b₁ engaged by a cut-away 111a provided in the flange 111. The engaging portion 119b₁ and the cut-away 111a of the flange 111 are disposed at locations corresponding to "P" or "P.S" when the pointer 8a on the mode change-over operating ring 8 is disposed at "P" or "P.S". When the overlap photography starting button 5 is not depressed, the sliding lever 106 has one end 106b displaced rightwardly in FIG. 3 on the flange 108a. In this state, the pivotable member 119 is placed in a condition wherein the restraining pawl 119a₁ of the pivotable member 119 is displaced clockwisely so as not to be engaged by the gear portion 97c. Also, in this state, the engaging portion 119b is placed at a position in which it is not engaged with the cut-away 111a of the flange 111. When the starting button 5 is depressed with the engaging portion 119b₁ of the pivotable member 119 corresponding to the cut-away 111a of the flange 111 and the slidingly shaft 108 is sliding displaced inwardly of the camera against the free of the spring 109, the flange 108a is disengaged from said one end 106b of the sliding lever 106. The sliding lever 106 is subjected to the bias of the spring 125 through the pivotable member 119 and slides to the left in response to the counter-clockwise rotation of the pivotable member 119 under the guidance of the slot 106c formed in the sliding member 106 engaged by the shaft 9, whereby the engaging portion 119b₁ of the pivotable member 119 is engaged with the cut-away 111a of the flange 111 and the end 106b of the sliding lever 106 bears against the peripheral surface of the sliding shaft 108 (see FIG. 12). The displaced position of the sliding shaft 108 inwardly of the camera is maintained with the upper surface of the flange 108a urged against the end 106b of the sliding lever 106 even if the starting button 5 is released. The release continues until the sliding lever 106 is again displaced rightwardly in FIG. 13, namely, until the end 106b of the sliding lever 106 is disposed outwardly of the flange 108. The return of the sliding lever and the pivotable member 119 to the position of FIG. 3, namely, the displacement of the sliding lever 106 and the pivotable member 119 so as to cause the end 106b of the sliding lever 106 to be located outwardly of the flange 108a, is usually effected in the overlap photography step to be described. If it is desired to return them prior to the overlap photography step being completed, the cancel knob 6 may be rotated until the pointer 6a on the knob 6 comes to a position corresponding to the mark "CANCEL". Thus, when the knob 6 is rotated until the pointer 6 comes to the position corresponding to the mark "CANCEL", the control cam pointer 6 rotating with the knob 6 bears against the pin 107 on the sliding lever 106 to enable the sliding lever 106 to be displaced rightwardly against the bias of the spring 125 until the end 106b of the slidable lever 106 becomes positioned outwardly of the flange 108. When the sliding lever 106 is displaced until the end 106a of the lever 106 comes to be positioned outwardly of the flange 108, the sliding shaft 108 is returned toward the outside of the camera by the force of the spring 109 and the peripheral surface of the flange 108a comes to bear against the end 106a of the sliding lever 106. In this manner, the knob 6 is turned until the pointer 6a on the knob 6 corresponds to the mark "CANCEL", whereafter the knob 6 is returned to its initial position, thereby restoring the position of FIG. 3.

Figure 13:
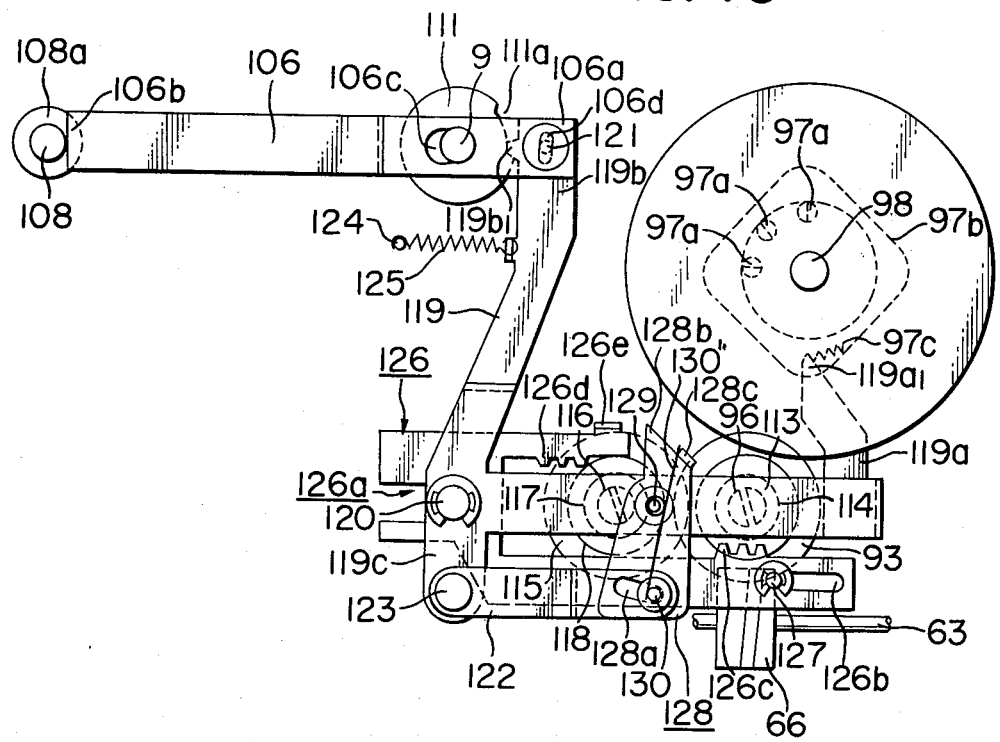
FIGS. 13 and 14 show the overlapping mechanism shown in FIG. 3 in two different positions of operation, FIG. 13 showing the start of fade-out phototaking and FIG. 14 showing the state just prior to fade-out.
Figure 14:
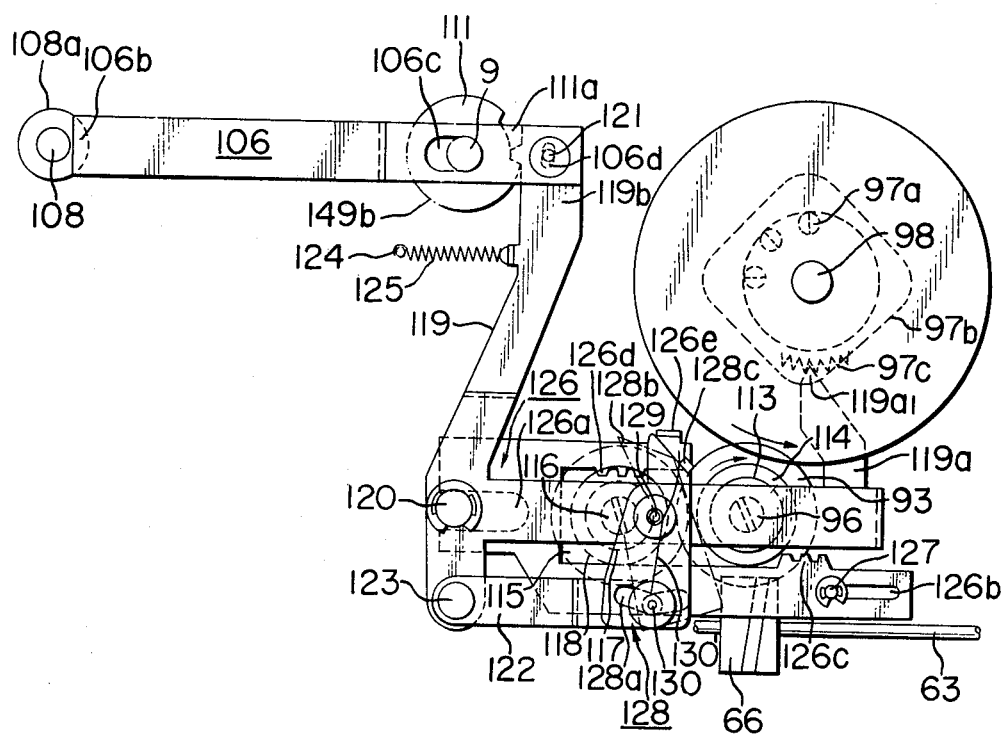

Designated by 126 is a moving member having a U-shaped portion 126c slidably engaged with the fixed shaft 120, a slot 126b engaged by a fixed shaft 127 secured to the bottom wall 23, a rack portion 126c engageable with the gear 113, a rack portion 126d engageable with the gear 117, and a bent portion 126e bent toward the pivotable member 119. In the condition wherein the moving member 126 is displaced leftwardly so that the gear 113 and the rack portion 126c are engaged with each other as shown in FIG. 13, the gear 93 is rotated counter-clockwisely to rotate the gear 113 counter-clockwisely by the operation of the clutch mechanism 114, whereupon the moving member 126 is moved until the gear 117 and the rack 126d are engaged with each other by the engagement of the gear 113 with the rack portion 126c, as shown in FIG. 3, and until the gear 113 is disengaged from the rack portion 126c. In that case, the rotation of the gear 115 is not transmitted to the gear 117 due to the above-noted operation of the clutch mechanism 115 even if the gear 117 comes into mesh-engagement with the rack 126d, and thus the moving member 126 is affected in no way. Thus, in the condition wherein the moving member 126 has been displaced rightwardly so as to bring the gear 117 and the rack portion 126d into mesh-engagement, when the gear 93 is rotated clockwisely, the gear 115 is rotated counterclockwisely. This counter-clockwise rotation of the gear 115 also causes counter-clockwise rotation of the gear 117 by the operation of the clutch mechanism 114, and the rotation of the gear 117 leftwardly displaces the moving member 126 by the engagement of the gear 117 with the rack portion 126d. Such displacement of the moving member 126 continues until the gear 113 meshes with the rack portion 126c and the gear 117 is disengaged from the rack portion 126d. Again in this case, the engagement between the gear 113 and the rack portion 126c affects the moving member 126 in no way because the rotation of the gear 93 is not transmitted to the gear 113 due to the operation of the clutch mechanism 114.

Designated by 128 is a pivotable member pivotally supported on a pin 129 studded in the restraining arm portion 119a of the pivotable member 119. The amount of rotation of the pivotable member 128 is limited by the engagement between a slot 128a formed in the member 128 and a pin 130 studded in the fixed member 122. The pivotable member 128 has an engaging portion 128b engaged by the bent portion 126e of the moving member 126, and a spring engaging portion 128c. The pivotable member 128 is also provided with a spring 130 held by the pin 129 with one end of the spring 130 being engaged with the said engaging portion 128c and the other end being engaged with the pin 130. The spring 130 normally biases the pivotable member 128 for counter-clockwise rotation about the pin 129. The relation between the pivotable member 128 and the moving member 126 is such that when the moving member 126 is displaced rightwardly, the bent portion 126e of the moving member 126 is positioned to the right of the engaging portion 128b of the pivotable member 128 and that when the moving member 126 is displaced leftwardly, the bent portion 126e of the moving member 126 is positioned to the left of the engaging portion 128b of the pivotable member 128. When the moving member 126 is displaced leftwardly, the bent portion 126c strikes against the engaging portion 128b, but the pivotable member 128 is permitted to rotate against the force of the spring 130 for counter-clockwise rotation, thus facilitating the leftward displacement of the moving member 126 by the push of the bent portion 126c. The bent portion 126c also strikes against the engaging portion 128b when the moving member displaced to the left is displaced back to the right. In this case, however, the clockwise displacement of the pivotable member 128 is limited by the slot 126b and the pin 130 and therefore, the pivotable member 128 is not rotated clockwisely so that the rightward movement of the moving member 126 does not easily take place. Accordingly, when the moving member 126 is displaced rightwardly by the above-described operation, the bent portion 126e urges the engaging portion into clockwise rotation so that the pivotable member 119 is pivoted clockwisely about the pin 120. Thus, when the pivotable member 119 is rotated clockwisely, the engaging portion 119b₁ of the pivotable member 119 retracts out of the cut-away 111a of the flange 111 and in response to the rotation of the pivotable member 119, the sliding lever 106 is also displaced rightwardly to release the engagement between the flange 108a and the end 106b of the sliding lever 106 to thereby permit the sliding shaft 108 to return to its initial position. When the moving member 126 is completely displaced rightwardly to release the engagement between the bent portion 126c and the engaging portion 128c, the pivotable member 119 is again rotatively returned counter-clockwisely by the spring 125, but in this case, the end 106b of the sliding lever 106 bears against the peripheral surface of the flange 108a, so that the pivotable member 119 is rotated and held just before the engaging portion 119b of the pivotable member 119 enters the cut-away 111a of the flange 111.

The mechanical construction of the cine camera according to the present invention has so far been described. In FIG. 6, the lamp 140 and the light-receiving element 141 indicated by dot-and-dash line are disposed on the opposite sides of the shutter comprising the shutter blades 71, 72 and 73. In the shown embodiment, instead of the mechanically constructed switch SW1, an electrical switch SW1' is employed. Such arrangement of the lamp 140 and the light-receiving element 114 provides a pulse-like signal from the light-receiving element 114 each time the shutter passes between the lamp 140 and the element 114, and such signal replaces the signal of the switch SW1.

Figure 15:
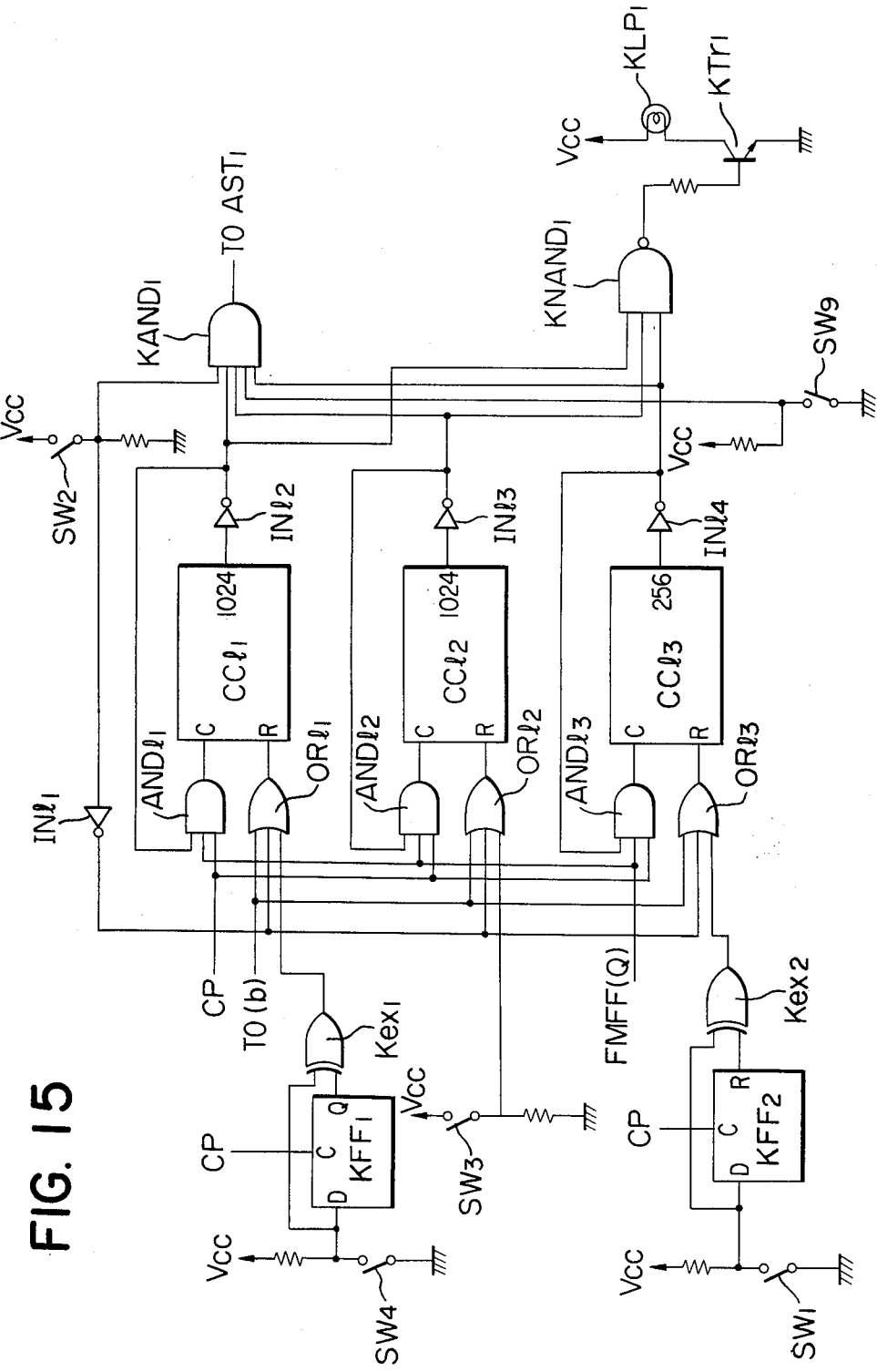
FIG. 15 shows one embodiment of a circuit for preventing improper operation used in the motion picture camera according to the invention.

FIG. 15 shows one embodiment of operational error preventing circuit used in a motion picture camera according to the invention as shown in FIGS. 2-14. In FIG. 15 the same reference numerals and characters as used in FIGS. 2-14 designate the same members and parts shown in FIGS. 2-14.

Designated by $IN1_1$ is an inverter the input terminal of which is connected to switch $SW_2$ and the output terminal is connected to the input of OR gates $OR1_1$-$OR1_3$. $AND1_1$ designates an AND gate, $CC1_1$ is a binary counter and $IN1_2$ is an inverter connected to the output 1024 of the binary counter $CC1_1$. These elements $AND1_1$, $CC1_1$ and $IN1_2$ constitute a first timer circuit for judging whether or not the film winding operation is normal. Similarly, AND gate $AND1_2$, binary counter $CC1_2$ and inverter $IN1_3$ constitute a second timer circuit for judging whether or not the loop of film is correct. AND gate $AND1_3$, binary counter $CC1_3$ and inverter $IN1_4$ constitute a third timer circuit for judging whether or not the rotational motion of the above described shutter is normal.

Designated by $KFF_1$ is a D-type flip-flop with its D input terminal being connected to the switch $SW_4$. Q-output terminal of the flip-flop is connected to one of the two input terminals of an exclusive OR gate $K1x_1$, the other input terminal of which is connected to the switch $SW_4$. Also, $KFF_2$ is a D-type flip-flop the D-input terminal of which is connected to the switch $SW_1$ and the Q-output terminal is connected to one of the two inputs of an exclusive OR gate $K1x_2$. Another input of the exclusive OR gate $K1x_2$ is connected to the switch $SW_1$. $KAND_1$ is an AND gate the inputs of which are connected to the outputs of the above described timer circuits and the switches $SW_2$ and $SW_9$, respectively. $KNAND_1$ is a NAND gate the inputs of which are connected to the outputs of the above described timer circuits, respectively. $KTr_1$ is a transistor the base of which is connected to the output of the NAND gate $KNAND_1$. Connected to the collector of the transistor $KTr_1$ is a lamp $KLP_1$ which puts on when the camera gets out of order.

Figure 16B:
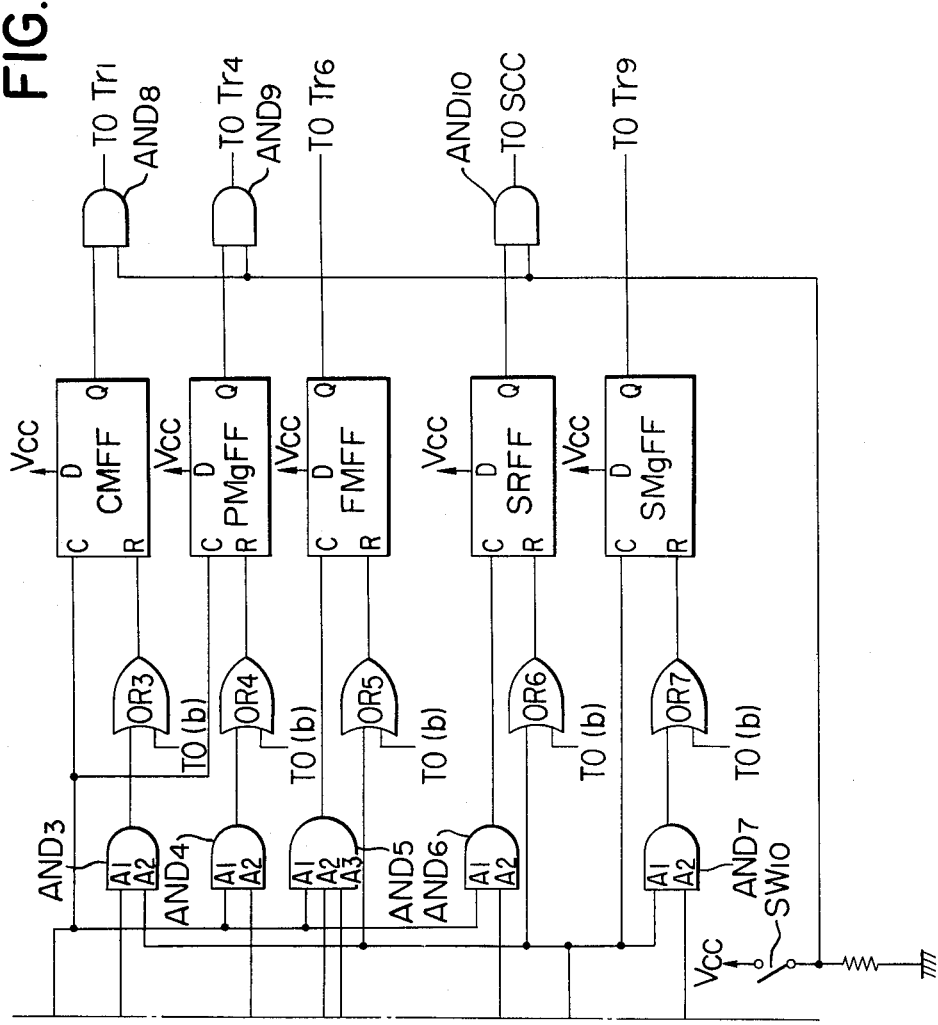

FIG. 16 shows an embodiment of sequence control circuit which, together with the circuit shown in FIG. 15, constitutes a control circuit for a motion picture camera according to the invention. D-type flip-flops $FF_1$ and $FF_2$ are shown in the circuit of FIG. 16. Input $D_1$ of the flip-flop $FF_1$ is connected to the output of the above described AND gate $KAND_1$ in FIG. 15 through an AND gate $AST_1$. The output $Q_1$ of $FF_1$ is connected to the input $D_2$ of $FF_2$. The output $Q_2$ of the flip-flop $FF_2$ is connected to one of the inputs of an exclusive OR gate $ex_1$ the other input of which is connected to the output $Q_1$ of the flip-flop $FF_1$. Since $FF_1$, $FF_2$ and $ex_1$ are connected in this manner, there is produced a single pulse from the output end of the exclusive OR gate $ex_1$ to reset the binary counter $CC_1$.

Connected to the output end of the exclusive OR gate $ex_1$ is an input terminal of OR gate $OR_1$, the output of which is connected to the reset terminal R of the counter $CC_1$. $AND_1$ is an AND gate the input terminal $A_1$ of which is connected to the output $Q_1$ of the flip-flop $FF_1$ and clock pulse CP is introduced to the second input $A_2$ from a clock pulse generator (not shown). The third input $A_3$ of $AND_1$ is connected to the output terminal 128 of the counter $CC_1$ through inverter $IN_1$. The output of the gate $AND_1$ is connected to the clock input end C of the counter $CC_1$ through OR gate $OR_2$. The function of $AND_1$ is to transmit to the counter $CC_1$ the clock pulse for effecting a start sequence as described hereinafter. $FF_3$ is a D-type flip-flop used to produce a stop sequence control signal for controlling a stop sequence as described hereinafter. The input terminal D of $FF_3$ is connected to the output terminal $Q_1$ of $FF_1$ through an inverter $IN_2$ and the clock input terminal C of $FF_3$ is connected to the above mentioned switch $SW_1$ which is turned on and off every time when the film is transported by an amount of one picture frame. The reset input terminal R of $FF_3$ is connected to the output terminal $Q_1$ of the flip-flop $FF_1$.

$AND_2$ is an AND gate constituting a gate circuit used to transmit to the counter $CC_1$ the clock pulse for effecting the later described stop sequence in response to the above mentioned stop sequence control signal. $AND_2$ has three input terminals $A_1$, $A_2$ and $A_3$ of which $A_1$ is connected to the output terminal 64 of the counter $CC_1$ through an inverter $IN_k$, $A_2$ is connected to the output Q of the flip-flop $FF_3$ and $A_3$ receives the clock pulse CP. The output of $AND_2$ is connected to the input of $OR_2$. CMFF is a D-type flip-flop for driving a capstan motor and has a voltage Vcc applied at its input terminal D. The clock input terminal C of the flip-flop CMFF is connected to the $Q_1$ output of $FF_1$ and the reset input terminal R thereof is connected to the output of $AND_3$ through $OR_3$. The AND gate $AND_3$ has two inputs $A_1$ and $A_2$ of which $A_1$ is connected to the output of $CC_1$ and $A_2$ is connected to the output Q of $FF_3$. The function of the AND gate $AND_3$ is to produce a signal by which the flip-flop CMFF is reset and the capstan driving motor Mc is stopped whenever the counter $CC_1$ has counted 64 pulses of clock pulse during stop sequence. PMgFF is a D-type flip-flop for driving the pinch roller magnet. To the input D of PMgFF there is applied a voltage Vcc and the clock input terminal C of the flip-flop PMgFF is connected to the output $Q_1$ of $FF_1$. During start sequence, PMgFF is set by output $Q_1$ so as to excite the magnet coil $PCL_1$. The reset terminal R of the flip-flop PMgFF is connected to the output of an AND gate $AND_4$ through an OR gate $OR_4$. One output $A_1$ and $AND_4$ is connected to the output $Q_1$ of the flip-flop $FF_1$ and another output $A_2$ is connected to the output terminal 32 of the counter $CC_1$. The AND gate $AND_4$ serves to produce a signal by means of which the flip-flop PMgFF is reset when the counter $CC_1$ has counted 32 pulses.

FMFF is a D-type flip-flop for driving the film motor and has a voltage Vcc applied at its input D. The clock input terminal C of FMFF is connected to the output of an AND gate $AND_5$ which has input $A_1$ connected to the output $Q_1$ of $FF_1$, input $A_2$ connected to the output terminal "32" and input $A_3$ connected to the output terminal "64" of $CC_1$. The AND gate $AND_5$ produces a signal by which the flip-flop FMFF is reset and the film driving motor $M_F$ is brought into operation when the counter $CC_1$ has counted 96 pulses during start sequence. The reset input terminal R of FMFF is connected to the output Q of the flip-flop $FF_3$ through an OR gate $OR_5$ so that FMFF may be reset in response to the above mentioned stop sequence control signal.

SRFF is a D-type flip-flop used to produce a sound recording signal for effecting sound recording by a sound recording circuit as described hereinafter. The flip-flop SRFF has a voltage Vcc applied at its input terminal D and the clock input terminal C of SRFF is connected to the output of an AND gate $AND_6$. $AND_6$ has input $A_1$ connected to the output $Q_1$ of $FF_1$ and input $A_2$ connected to the output terminal 128 of the counter $CC_1$. The gate $AND_6$ produces a signal by means of which the flip-flop SRFF is set and the above mentioned sound recording signal is issued from the output Q when the counter $CC_1$ has counted 128 pulses of clock pulse during start sequence. The reset input terminal R of SRFF is connected to the output Q of the flip-flop $FF_3$ through an OR gate $OR_6$ so that SRFF may be reset in response to the above mentioned stop sequence control signal.

SMgFF is a D-type flip-flop for driving the stop magnet and has a voltage Vcc applied at its input terminal D. The clock input terminal C of SMgFF is connected to output Q of the flip-flop $FF_3$ so that SMgFF may be reset in response to the above mentioned stop sequence control signal. Reset input terminal R of SMgFF is connected to the output of an AND gate $AND_7$ through an OR gate $OR_7$. The gate $AND_7$ has input $A_1$ connected to the output Q of $FF_3$ and input $A_2$ connected to the output terminal 32 of $CC_1$. The gate $AND_7$ produces a signal by which the flip-flop SMgFF is reset when the counter $CC_1$ has counted 32 pulses of clock pulse during stop sequence.

Each of three AND gates $AND_8$, $AND_9$ and $AND_{10}$ has two inputs one of which is connected to switch $SW_{10}$ in such manner that when $SW_{10}$ is ON, a high level signal is applied to said input terminal. Another input is connected to the output Q of the corresponding one of the above described flip-flops CMFF, PMgFF and SRFF in such manner that Q-outputs may be transmitted to the corresponding circuits described hereinafter respectively from the flip-flops CMFF, PMgFF and SRFF only when photographing with simultaneous sound recording is carried out.

A condenser $C_1$ and a resistance $R_1$ constitute together a timer circuit which momentarily produces a power-up-clear signal PUC from its output terminal (b) when the main switch $SW_M$ is turned on. $OR_3$–$OR_7$ are OR gates with each one input terminal being connected to the output terminal (b) of the above mentioned timer circuit.

$CT_1$ is a binary counter the reset input terminal R of which is connected to the switch $SW_E$ through an inverter $TDIN_1$ and the clock input terminal C of $CT_1$ is connected to the output of an AND gate $TDA_1$. One input of the gate $TDA_1$ is connected to the output terminal 512 of the counter $CT_1$ through an inverter $TDIN_2$ and the other input has clock pulse CP applied thereto. These elements $TDA_1$, $TDIN_1$, $TDIN_2$ and $CT_1$ constitute a timer circuit for producing a trigger signal only when the diaphragm control circuit EE has reached a stable operative condition after a trigger action.

In FIG. 16, lamp 224 and light receiving element 225 suggested by phantom correspond to the lamp 140 and light receiving element 141 shown in FIG. 6, respectively, and constitute a photoelectric switch. This photoelectric switch (140, 141) and the mechanical $SW_1$ are selectively used. All of the flip-flops described above with reference to FIGS. 15 and 16 are so constructed that they are set in synchronism with rising of pulse and also the counters shown in FIGS. 15 and 16 are so constructed that their counting operations are in synchronism with falling of the pulse. In this embodiment, the clock pulse CP has a cycle of 1 mm sec..

Figure 17A:
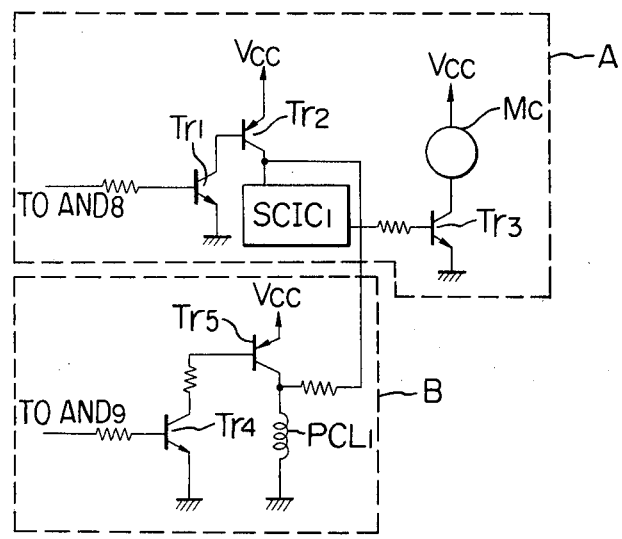
FIG. 17A shows an embodiment of a capstan motor driving circuit and pinch roller magnet driving circuit.

FIG. 17A shows one embodiment of each of capstan motor driving circuit and pinch roller magnet driving circuit. In FIG. 17A, the circuit enclosed by the dotted line A is a capstan motor driving circuit and that enclosed by B is a pinch roller magnet driving circuit. Main elements of the former are transistors $Tr_1$, $Tr_2$ and $Tr_3$ and a speed control circuit $SCIC_1$. Collector of $Tr_1$ is connected to base of $Tr_2$ and base of $Tr_1$ is connected to the output of the AND gate $AND_8$ shown in FIG. 16 through a resistor. A voltage Vcc is applied to the emitter of $Tr_2$ the collector of which is connected to the speed control circuit $SCIC_1$. Connected to the output terminal of $SCIC_1$ is the base of $Tr_3$ the collector of which is connected to the capstan motor Mc. A resistor is interposed between the base of $Tr_3$ and the output terminal of $SCIC_1$. As the speed control circuit $SCIC_1$ there may be used an IC of No. TCA 955 supplied by SIEMENS Company, West Germany.

The pinch roller magnet driving circuit includes transistors $Tr_4$ and $Tr_5$ and a pinch roller magnet coil $PCL_1$ as main elements. Base of $Tr_4$ is connected to the output terminal of gate $AND_9$ shown in FIG. 16 through a resistance and the collector of $Tr_4$ is connected to the base of $Tr_5$ through a resistance to the emitter of which is applied a voltage Vcc. The collector of $Tr_5$ is connected to $PCL_1$.

Figure 17B:
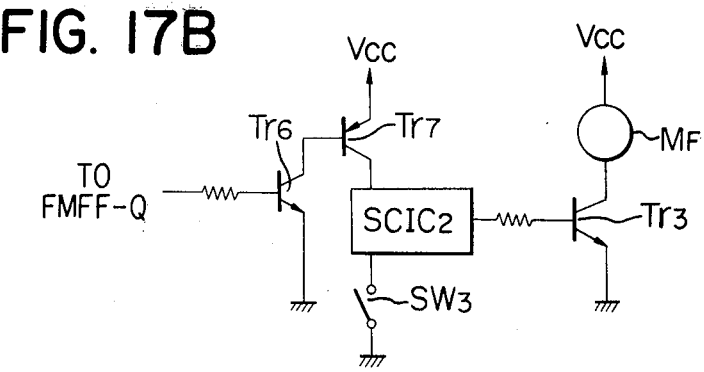
FIG. 17B shows an embodiment of a film motor driving circuit.

FIG. 17B shows an embodiment of film motor driving circuit. In the circuit shown in FIG. 17B, $Tr_6$ is a transistor the base of which is connected to the output Q of the flip-flop FMFF shown in FIG. 16. $Tr_7$ is a transistor the base of which is connected to the collector of $Tr_6$. $Tr_6$ and $Tr_7$ together constitute a switching circuit for power supply to the speed control circuit $SCIC_2$ which is of the same type (TCA 955) as the above mentioned $SCIC_1$. Designated by $SW_3$ is a switch serving as the loop sensor previously described with reference to FIGS. 2C and 3. The switch $SW_3$ detects the amount of film slack and when the slack reaches a predetermined level the switch is turned OFF and its OFF signal is given to the speed control circuit $SCIC_2$ so as to adjust the film feeding speed to about 20 frames/sec. while keeping the speed at 16 frames/sec. so long as the switch $SW_3$ remains ON. $Tr_8$ is a transistor which is controlled by the output of the speed control circuit and the collector of $Tr_8$ is connected to the film driving motor $M_F$.

Figures 17C, 17D:
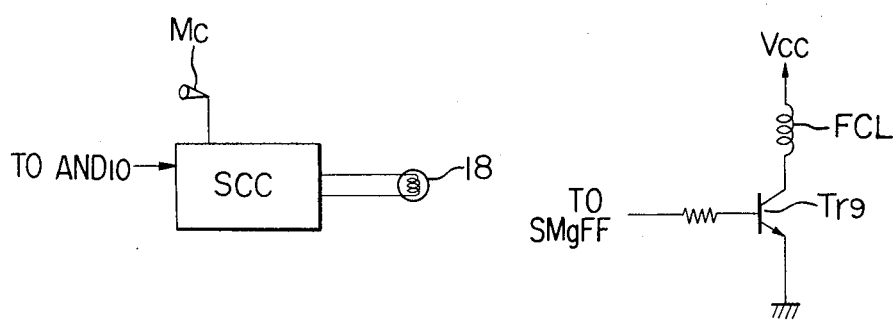
FIG. 17C shows an embodiment of a sound recording circuit.
FIG. 17D shows an embodiment of a stop magnet driving circuit.

FIG. 17C is a block diagram showing an embodiment of sound recording circuit. Designated by MC is a microphone and SCC is a circuit for recording the sound from microphone MC. This sound recording circuit SCC is known per se. In response to the sound recording signal coming from the previously described flip-flop SRFF, the recording circuit SCC applies electric current to the recording head 27 so that sound transmitted from the microphone MC may be recorded on a magnetic recording strip coated on the film surface.

FIG. 17D illustrates an embodiment of stop magnet driving circuit. $Tr_9$ of the circuit is a transistor the base of which is connected to the output Q of the flip-flop SMgFF shown in FIG. 16. Collector of $Tr_9$ is connected to magnet coil FCL for driving a stopper member 65.

Now, the operation of cinecamera capable of simultaneous sound recording according to the invention will be described.

Description is made first for a normal motion picture taking mode in which picture and sound are simultaneously recorded using a sound film cassette containing therein a sound film $F_2$ on which picture and sound can be recorded.

When the cover 17 is opened and there is no sound film cassette inserted in the cassette receiving chamber 1a, the cassette type detection member 55 is projected into the chamber 1a by the spring force of contact blade of the switch $SW_{10}$ which is at this time in its open position. In this position of the apparatus, the swing member 39 is in a position rotated clockwise as viewed in the drawing of FIG. 5. Shifting members 35, 38 are also in their rest positions mentioned above. In this position of the apparatus, between the capstan shaft 28 and the pinch roller 32 as well as between the magnetic head 27 and the pressure pad 26 there are provided larger spacings to accommodate the insertion of the sound film cassette $C_2$ into the cassette receiving chamber 1a.

When the cassette receiving chamber 1a is loaded with the sound film cassette $C_2$ and closed with the cover 17, the detection member 55 is pushed down by the inserted cassette $C_2$ so that the switch $SW_{10}$ is closed and at the same time the swing member 39 is rotated counter-clockwise as viewed in FIG. 5. This causes, in turn, the shifting members 35, 38 to move into the position ready for picture taking. In this position of the apparatus, the magnetic head 27 and the pressure pad 26 come into elastic engagement with each other and the capstan 28 and the pinch roller 32 come close to each other leaving a small gap therebetween.

Now, the operator can close the main switch $SW_M$. Closing of the main switch makes a voltage Vcc applied to each one input terminal of the AND gates $AND_8$–$AND_{10}$. Also, at the same, voltage Vcc is applied to a timing circuit composed of condenser $C_1$ and resistor $R_1$ and thereby at the output terminal (b) of the timing circuit there is produced an instantaneous high level signal for a time length determined by the time constant of the circuit. This high level signal is applied to the reset input terminal R of the counter $CC_1$ through $OR_1$ to reset the counter. The same high level signal issued from the output terminal (b) of the timing circuit is applied also to every reset input terminal R of the flip-flops CMFF, PMgFF, FMFF, SRFF and SMgFF through $OR_3$–$OR_7$, respectively, to reset these flip-flops. Furthermore, the signal is used to reset the counters $CC1_1$–$CC1_3$ shown in FIG. 15.

Now, the operator can push the trigger button 16. Pushing down of the trigger button makes EE switch $SW_E$ turned on during the first stroke of the trigger plate 56 linked with the trigger button 16. Thereby, the automatic diaphragm control circuit EE which is known per se and may be formed using, for example, a known photometering circuit is actuated so that the diaphragm is automatically controlled in accordance with the brightness prevailing at that time. Turning on of the switch $SW_E$ also results in releasing the counter $CT_1$ from its reset position and the counter starts counting clock pulses coming through AND gate $TDA_1$. When the counter $CT_1$ has just counted 512 pulses of the clock pulse CP after turning on of the switch $SW_E$, that is, 512 mm seconds after the turning on of the switch $SW_E$, there is produced a high level signal from the output terminal 512 of the counter $CT_1$. This high level signal is transmitted to one input terminal of AND gate $AST_1$. This high level signal constitutes a trigger signal. When the operator continues pushing the trigger button 16 after $SW_E$ was turned on and the second stroke of the trigger plate 56 linked with the trigger button turns the switch $SW_2$ on as shown in FIG. 18(a), then a high level signal is applied to another input terminal of the AND gate $AST_1$. However, it should be noted that the high level signal functioning as a trigger signal can be put out from the AND gate $AST_1$ only when 512 mm seconds has passed after the turning on of the switch $SW_E$. This means that no trigger signal is delivered up to the input terminal D of the D-type flip-flop $FF_1$ until the operation of the diaphragm control circuit reaches a stable condition after the turning on of the switch $SW_E$.

Under the condition that the film is present on the film gate member 21a, that is, switch $SW_9$ is off, the movement of the trigger plate 56 up to the second stroke will make switch $SW_2$ turned on and a high level signal will be put out from the gate $KAND_1$ because the counters $CC1_1$–$CC1_3$ shown in FIG. 15 have been reset as described above. Therefore, the high level signal is applied to one of the input terminals of $AST_1$ shown in FIG. 16 and then a high level signal functioning as a trigger signal is put out from the output terminal of $AST_1$ after the operation of the diaphragm control circuit EE has become stable.

As a result, a high level signal is applied to the input terminal D of the flip-flop $FF_1$ and in timing with the rising of clock pulse $CP_2$ shown in FIG. 18(b), the output terminal $Q_1$ of the flip-flop $FF_1$ puts out a high level signal as shown in FIG. 18(c). The high level signal is put into each clock input terminal C of the flip-flops CMFF and PMgFF so that these flip-flops are set and they produce a corresponding high level signal, respectively, from their output terminals Q. The high level signal issued from CMFF is transmitted to one of the input terminals of the gate $AND_8$ and the high level signal issued from PMgFF is transmitted to one of the input terminals of $AND_9$. Since each of $AND_8$ and $AND_9$ has a high level signal applied to the other input terminal as described above, the outputs from the flip-flops CMFF and PMgFF are allowed to enter the bases of the transistors $Tr_1$ and $Tr_4$ shown in FIG. 17(a) respectively. This turns the transistors $Tr_1$ and $Tr_2$ on and thereby power is supplied to the speed control circuit $SCIC_1$ for capstan motor. By the output from the speed control circuit $SCIC_1$, transistor $Tr_3$ is controlled so that the capstan driving motor Mc is now driven into rotation. At the same time, the output from PMgFF turns the transistors $Tr_4$ and $Tr_5$ on so that the magnet coil PCL in the electromagnetic device PMg is excited. As a result of excitation of the magnet coil PCL, a piece of iron 51 of the electromagnetic device PMg is attracted toward the magnet coil $PCL_1$ so as to rotate the swing lever member 49 clockwise together with the iron member 51. At the same time, the shifting members 35, 38 are shifted from their rest position to operative position so that the capstan 28 and the pinch roller 32 are brought into elastic engagement with the film $F_2$ being pinched therebetween. The shaft of capstan 28 is driven in rotation by motor Mc and therefore when the capstan comes into elastic engagement with the pinch roller in the above mentioned manner, a feeding of film $F_2$ at a constant speed can be started.

After the capstan driving motor Mc and the magnet coil PCL have been brought into operation in a manner as described above and when clock pulse $CP_3$ is applied to the clock input terminal C of the flip-flop $FF_2$, the latter is set in synchronism with the rising of the clock pulse $CP_3$ to issue a high level signal from its output terminal $Q_2$ as shown in FIG. 18(d). As a result, a single pulse as shown in FIG. 18(e) is put out from the output terminal (a) of the exclusive OR gate $ex_1$ the input terminal of which is connected to the outputs $Q_1$, $Q_2$ of the flip-flops $FF_1$, $FF_2$. The single pulse is introduced into the reset input terminal R of the counter $CC_1$ through the gate $OR_1$ to reset the counter again. Therefore, output at the output terminal 128 of the counter $CC_1$ is switched down to a low level and a high level singal is given to the input terminal $A_3$ of the gate $AND_1$ through inverter $IN_1$. Since the gate $AND_1$ has at its input terminal $A_1$ also an output coming from the output Q of the flip-flop $FF_1$ which is at high level at that time as shown in FIG. 18(c), the AND gate $AND_1$ continues to be opened from the time point $t_1$ as shown in FIG. 18(f). Therefore, the clock pulse can be transmitted to the clock input terminal C of the counter $CC_1$ through $AND_1$ and $OR_2$. Now, the counter $CC_1$ begins binary counting. At the time when the counter $CC_1$ has counted 32 pulses since the start of binary counting operation, namely at the time point of $t_2$ at which clock pulse $CP_{34}$ has just been produced from the counter $CC_1$, a high level signal is put out from the output terminal 32 of $CC_1$ and the high level signal is applied to the input terminal $A_2$ of the gate $AND_4$. On the other hand, the first input terminal $A_1$ of $AND_4$ is connected to the output $Q_1$ of the flip-flop $FF_1$ and receives a high level signal therefrom. Therefore, at the time point of $t_2$, the high level signal is transmitted from the gate $AND_4$ to the reset input terminal R of the flip-flop PMgFF through $OR_4$ so that the flip-flop may reset at $t_2$ as shown in FIG. 18(h). By resetting of the flip-flop PMgFF at the time point $t_2$, power supply to the magnet coil PCL through transistors $Tr_4$ and $Tr_5$ shown in FIG. 17 is shut off. However, transistor $Tr_2$ remains ON and an electric current is allowed to continue flowing to the magnet coil PCL through the transistor to keep the pinch roller 32 in operation.

As previously described, the cycle of the clock pulse is 1 mm second and the flip-flop PMgFF is continuously set during the time of 32 clock pulses being counted. This means that during the first time period of about 32 mm seconds there exists a large current flowing to the magnet coil PCL and thereafter only a small current flows into the coil. At the beginning of driving, the magnet coil PCL has to have a strong attraction which needs supply of large current, but thereafter there is no need for the magnet coil PCL to have a strong attraction force and therefore a small current is sufficient enough to continue driving the film feeding device. For this reason, a large current is supplied to the magnet coil only for the beginning of operation as described above. This contributes to a substantial saving of electric power.

After the flip-flop PMgFF being reset by the clock pulse $CP_{34}$, the counter $CC_1$ continues further counting clock pulse. When the counter has counted 96 pulses, that is, at the time point $t_3$ in which the clock pulse $CP_{98}$ has just been put out from the counter, there appear high level signals at the output terminals 32 and 64 of the counter $CC_1$. These high level signals are introduced into the input terminals $A_2$ and $A_3$ of the gate $AND_5$, respectively. Because of the presence of high level signal at the remaining input terminal $A_1$ of $AND_5$ transmitted from $FF_1$, the flip-flop FMFF is set at the time point $t_3$ and a corresponding high level signal is produced from the output terminal Q of FMFF. As a result, transistors $Tr_6$ and $Tr_7$ shown in FIG. 17B are turned ON and power supply to the speed control circuit $SCIC_2$ is started. The speed control circuit $SCIC_2$ controls the transistor $Tr_3$ so that the film driving motor $M_F$ starts rotating to initiate film feeding operation. In this manner, the film driving motor $M_F$ is brought into operation only when the counter $CC_1$ has counted 96 clock pulses, that is, about 96 mm seconds after the start of the capstan driving motor Mc. This time lag from start of the capstan motor Mc to that of the film motor $M_F$ brings forth a particular advantage. Even when the film $F_2$ is inserted into the cassette receiving chamber 1a with a portion of the film corresponding to several frames being slackened within the inserted cassette $C_2$, such slack of the film will be taken up before the film driving motor $M_F$ is started because the capstan driving motor Mc is started about 96 mm seconds earlier than the film driving motor is. During this time period of about 96 mm seconds, the slack of film is removed by the rotation of the capstan driving motor and the film becomes tight before steady film feeding operation is started. In this manner, jamming trouble which often occurs when film feeding operation is started with a slackened film can be eliminated according to the above embodiment of the invention.

After the steady film feeding operation being started in the above mentioned manner, the counter $CC_1$ continues further counting clock pulse. When the counter has counted 128 clock pulses, that is, at the time point $t_4$ in which clock pulses $CP_{130}$ has just generated, the counter $CC_1$ puts out a high level signal from its output terminal 128. This high level signal is introduced into the input terminal $A_2$ of the gate $AND_6$ which has at its another input terminal $A_1$ a high level signal coming from the flip-flop $FF_1$. Therefore, at the time point of $t_4$, flip-flop SRFF is set to produce a corresponding high level signal from its output Q so that the above mentioned sound recording signal is generated. Since the output Q of the flip-flop SRFF is connected to one input terminal of the AND gate $AND_{10}$ which has at its another input terminal a high level signal as described above, the sound recording signal is transmitted to the sound recording circuit shown in FIG. 17D through the gate $AND_{10}$. Now, electric current is allowed to flow into the recording head 27 to commence sound recording operation. As will be understood from the foregoing, the sound recording operation can be started only when the counter $CC_1$ has counted 128 pulses, that is, 32 mm seconds after the start of the film feeding operation. This brings forth an advantage that sound recording on a strip of magnetic material coated onto the film $F_2$ can be started only after feeding operation of the film $F_2$ become steady and stable.

Upon the time of the sound recording being started by clock pulse $CP_{130}$, the high level signal issued from the output terminal 128 of the counter $CC_1$ is inverted into a low level signal by the inverter $IN_1$ and the low level signal is applied to the input terminal $A_3$ of the gate $AND_1$ so as to stop the pulse counting operation of $CC_1$.

Figure 19:
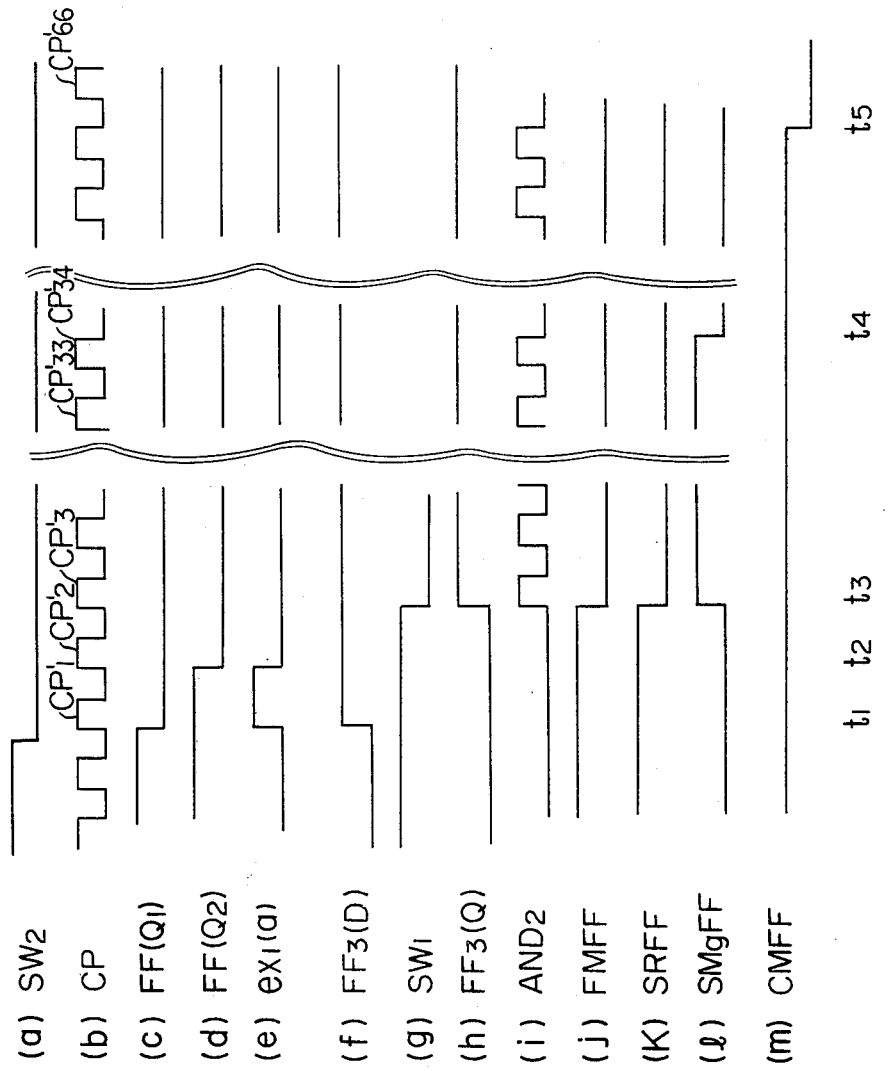
FIG. 19 is a wave form for the stop sequence operation thereof.

In this manner, all the operations of start sequence necessary for stating picture taking with simultaneous sound recording are completed. After the completion of start sequence, picture taking with simultaneous sound recording moves on so long as the operator continues pushing the trigger button 16. When the operator stops pushing the trigger button during shooting and the trigger button is released from pressure, the switch $SW_2$ turnes OFF as shown in FIG. 19(a) and the gates $KAND_1$ and $AST_1$ produce low level signal. Thereby, a low level signal is applied to the input terminal $D_1$ of the flip-flop $FF_1$ so that in timing with the pulse $CP'_1$ shown in FIG. 19(b), the signal at the output $Q_1$ of the flip-flop $FF_1$ is changed to a low level signal at the time point of $t_1$ as shown in FIG. 19(c). The low level signal is transmitted to the input terminal $D_1$ of the flip-flop $FF_2$ which in turn produces a low level signal from its output terminal $Q_2$ at the time point of $t_2$ in synchronism with the pulse $CP'_2$ as shown in FIG. 19(d). On the other hand, at the time point $t_1$, a high level signal is applied to the input D of the flip-flop $FF_3$ through the inverter $IN_2$ because the output of $FF_1$ becomes low level at the time point $t_1$. Therefore, when switch $SW_1$ ON-OFF of which is controlled by the rotation of shutter member is turned OFF, a rising pulse is transmitted to the clock terminal C of $FF_3$ which in turn puts out from its output terminal Q a high level signal, namely the above mentioned stop sequence control signal as shown in FIG. 19(h).

The stop sequence control signal is introduced into each the reset input terminal R of the flip-flops FMFF and SRFF through the gates $OR_5$ and $OR_6$ respectively so that the flip-flops are reset at the time point $t_3$ as shown in FIGS. 19(j) and (k). Also, at the time point $t_3$ the transistor $Tr_6$ shown in FIG. 17B is turned OFF. As a result, power supply to the speed control circuit $SCIC_2$ is stopped, power supply to the film driving motor $M_F$ is stopped and then the film feeding by the motor $M_F$ is stopped. At the same time, by resetting of the flip-flop SRFF, the sound recording signal coming in the sound recording circuit SCC shown in FIG. 17C is extinguished so that recording operation comes to end at the time point of $t_3$. Since the stop sequence control signal is also applied to the clock input terminal C of the flip-flop SMgFF, this flip-flop is reset at the time point $t_3$ as shown in FIG. 19(l) and the transistor $Tr_9$ shown in FIG. 17D is turned ON to excite the stopper magnet coil FCL of the electromagnetic device FMg. As a result of excitation of the magnet coil FCL, the slide iron rod member 92 is moved toward the gear 64 by the magnetic attraction force. This movement of the iron slide member 92 causes the stopper member 65 to slide move toward the slot $64b_1$ of the gear 64 against the action of the spring 95. When the stopper 65 comes into engagement with the slot $64b_1$, the gear 64 is stopped at a predetermined position.

As described above, the stop sequence control signal is generated in the shown apparatus when the switch $SW_1$ is turned to its off-position from its on-position. This is because the switch $SW_1$ is so formed as to change its position from ON to OFF at the time when the shutter composed of three shutter blades 71, 72 and 73 is in transition from the open phase in which the shutter opens the aperture 58a to the close phase in which it closes the aperture. By exciting the stopper magnet coil SCL at this stage of operation, it is assured that the shutter is stopped by the stopper member 65 just at the position in which the shutter exactly closes the aperture 58a.

The above mentioned stop sequence control signal is also applied to the input terminal $A_2$ of the gate $AND_2$ the other input terminal $A_1$ of which is connected to the output terminal 64 of the counter $CC_1$ through the inverter $IN_2$ and the counter $CC_1$ has been reset by the single pulse produced at the time point of $t_1$ as seen in FIG. 19(e). Therefore, at the time point of $t_3$ there is produced a low level signal from the output terminal 64 of the counter $CC_1$ and the gate $AND_2$ has a high level signal applied to its input terminal $A_1$ at the time point $t_3$. This means that from the time point $t_3$ the gate $AND_2$ becomes open and from the same time point $t_3$ the counter $CC_1$ starts counting.

In this manner, after the power supply to the film driving motor $M_F$ is stopped and then the stopper magnet coil FCL is excited at the time point of $t_3$, binary counting of the counter $CC_1$ is started. Thereafter, when 32 clock pulses are counted from the start of counting operation, that is, at the time point of $t_4$ (32 mm seconds after the start of counting operation) there is produced a high level signal from the output terminal 32 of the counter $CC_1$. This signal is introduced into one terminal $A_2$ of the gate $AND_7$. At this time, the gate $AND_7$ has at its another input terminal $A_1$ also the stop sequence control signal transmitted from the flip-flop $FF_3$. Therefore, the signal issued from the output terminal 32 of $CC_1$ is allowed to come into the reset input terminal R of the flip-flop SMgFF through $AND_7$ and $OR_7$ to reset the flip-flop at the time point $t_4$. Thus, at the time point of $t_4$, the transistor $Tr_9$ in FIG. 17D is turned Off and the stopper magnet coil SCL is deenergized into unexcited state. Since the attraction force of FCL acting upon the slide iron member 92 is lost, the stopper member 65 is returned to its starting position by the action of the spring 95 and disengaged from the slot $64b_1$ of the gear 64.

After disengagement of the stopper 65 from the slot $64b_1$ on the gear 64, the counter $CC_1$ continues further counting and produces a high level signal from its output terminal when further 32 clock pulses are counted by the counter, that is, at the time point of $t_5$. The high level signal is then introduced into the one input terminal $A_1$ of the gate $AND_3$. At this time the gate $AND_3$ has at the other input terminal $A_2$ also the stop sequence control signal transmitted from the flip-flop $FF_3$. Therefore, the high level signal issued from the output terminal 64 of $CC_1$ is allowed to come into the reset input terminal of the flip-flop CMFF through $AND_3$ and $OR_3$ to reset CMFF at the time point $t_5$ as shown in FIG. 19(m). Thereby transistors $Tr_1$ and $Tr_2$ shown in FIG. 17A are turned Off so that power supply to the speed control circuit $SCIC_1$ is stopped. Also, transistor $Tr_3$ is turned Off so that the capstan driving motor Mc is stopped. Transistor $Tr_2$ is also turned Off so that all power supply paths leading to pinch roller magnet coil PCL are cut off. Thereby, the magnet coil PCL is deenergized to unexcited state, which allows the shifting members 35, 38 and therefore the pinch roller to return to their starting positions. On the other hand, the high level signal issued from the output terminal 64 of $CC_1$ is inverted by inverter $IN_2$ to a low level signal which is introduced into the input terminal $A_1$ of the gate $AND_3$ so that the gate $AND_2$ becomes closed at the time point of $t_5$. As a result, the counting operation of the counter $CC_1$ is stopped, all the procedures of stop sequence are completed and picture taking with the charged film $F_2$ comes to end.

As described above, in the stop sequence procedure, the film driving motor $M_F$ is stopped at the time point $t_3$ and then the capstan driving motor Mc is stopped 64 mm second (64 clock pulses) after the stop of $M_F$. This has an advantage that a slack of the film $F_2$ which may be produced at the time of the film driving motor $M_F$ being stopped can be removed by the rotation of the capstan driving motor Mc which continues for 64 mm seconds after the film driving motor $M_F$ being stopped. In this manner, at the time of completion of one picture taking process, film $F_2$ in the cassette $C_2$ is restored to a proper state without any slack.

After the completion of the picture taking process in the above described manner, the cassette $C_2$ containing therein the sound film $F_2$ on which pictures and sounds have been recorded is taken out from the film cassette receiving chamber 1a. To take out the cassette $C_2$, the cover 17 is opened at first. In linkage with the opening motion of the cover 17, the swing lever member 39 is rotated clockwise as viewed in FIG. 5 followed by the movement of shifting members 35, 38 to their rest positions. As a result, the capstan shaft 28 is spaced out from the pinch roller 32 and the magnetic head 27 from the pressure pad 26 so as to provide a large space therebetween to accommodate taking-out of the film cassette $C_2$ from the receiving chamber 1a.

The manner of sequence control for carrying out picture taking with simultaneous sound recording using a sound film cassette $C_2$ has been described with reference with the related drawings.

Hereinafter, description will be made of the sequence control for carrying out silent picture taking using a silent film cassette $C_1$ containing therein a silent film $F_1$ on which only pictures can be recorded and sound recording is impossible.

The manner of sequence control for silent picture taking is essentially the same as that for sound picture taking described above. For silent picture taking there is used a silent film cassette $C_1$ which is different in structure from the above described cassette $C_2$ for sound film. When the silent film cassette $C_1$ is inserted into the cassette receiving chamber $1a$, the cassette $C_1$ does not press the detection member 55. Therefore, the detection member 55 remains in the position where the member 55 projects into the cassette receiving chamber $1a$ under the action of spring force of contact blade of switch $SW_{10}$. As seen from the fact, switch $SW_3$ remains always closed for silent picture taking process and therefore the capstan motor driving circuit, pinch roller magnet driving circuit and sound recording circuit as shown in FIGS. 17A and 17B remain inoperative for silent picture taking process. Even when the main switch SWM is closed to set the flip-flops CMFF, PMgFF and SRFF, the gates $AND_8$–$AND_{10}$ are unable to transmit the outputs of these flip-flops to the above mentioned driving circuits and sound recording circuit. Film driving motor $M_F$ and stopper magnet coil FCL only are sequence-controlled with the previously described timing.

When the operator pushes the trigger button 16, the release plate 56 replying to the pushing motor of the trigger button closes the switch $SW_2$. However, the shifting members 35, 38 remain unmoved in the above described preparation positions because of the absence of electric current flowing into the pinch roller magnet driving circuit and the sound recording circuit. Therefore, the magnetic head 27 and the capstan driving motor Mc remain always unactuated for silent picture taking sequence.

As for other parts of the sequence for silent picture taking, the manner of operation of the apparatus is entirely the same as that described hereinbefore for sound picture taking process and need not to be further described.

Start sequence with which picture taking is started and stop sequence with which picture taking is stopped in the motor picture camera according to the invention have been described in detail.

As already mentioned above, the circuit shown in FIG. 15 constitutes one of the important features of the present invention. The circuit serves as a disorder operation detecting circuit with which various control operations for controlling film winding motion, amount of film loop, rotation of shutter ect. are always detected during picture taking and if any disorder in operation is detected, the stop sequence is effected at once to stop the proceeding of picture taking.

Now, the disorder detecting operations according to the invention will be described in detail in connection with each the control operation.

Figure 20:
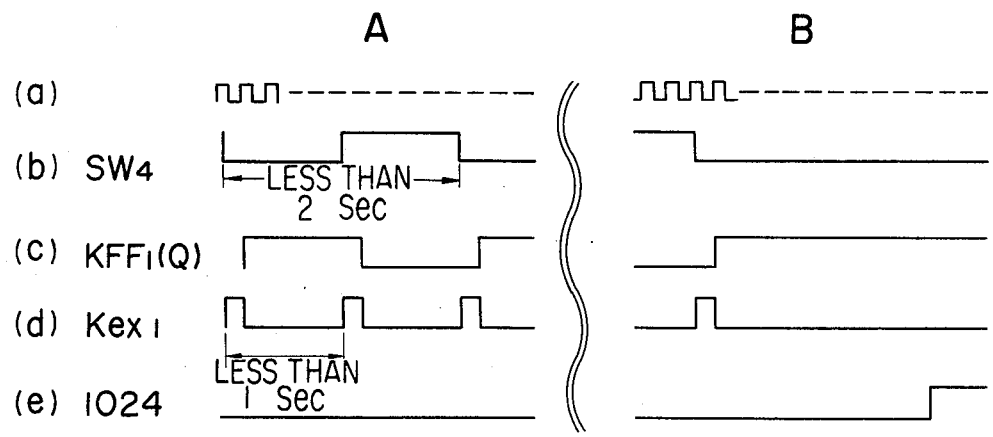
FIG. 20 is a wave form chart for film winding operation.

At first, detection of film winding control operation is described. To this end, a combination of film feeding switch $SW_4$ and a cam member $67b$ is used. The switch $SW_4$ is actuated interlocking with the rotation of film winding shaft 97 and its on-off operation is controlled by the cam member $97b$. Normally, on-off action of $SW_4$ is repeated four times during one rotation of the film winding shaft 97. Therefore, as long as film winding operation is normal, the cycle of on-off operation of $SW_4$ is kept at a predetermined value which is shorter than two seconds as shown in FIG. 20A-(b) and is never over two seconds. Accordingly, as shown in FIG. 20A-(c), the pulse signal issued from the output Q of the flip-flop $KFF_1$ during normal operation has a pulse cycle shorter than 2 seconds. Therefore, the output of exclusive OR gate $Klx_1$ produces a single pulse at a cycle less than a second as shown in FIG. 20A-(d) and the single pulse is put into the counter $CCl_1$ through the gate $ORl_1$ to reset the counter. It will be understood that during normal film winding operation the counter $CCl_1$ is reset every cycle of time less than a second. On the other hand, to the clock input terminal C of the counter there is applied a clock pulse of 1 mm sec. cycle through the gate $ANDl_1$ so long as the film driving motor $M_F$ continues rotating. As a result, the counter $CCl_1$ starts counting pulse immediately after it is reset. When 1024 clock pulses are countered by the counter, that is, one second after resetting of the counter, a high level signal can be issued from the output terminal 1024 of the counter, said signal being transmitted to the gate $KAND_1$ as a low level signal through the inverter $INl_2$. However, during normal and proper operation, the output terminal 1024 of the counter $CCl_1$ never issued such high level signal because, as described above, resetting cycle of $CCl_1$ is shorter than one second and therefore the counter $CCl_1$ always has been reset before it counts 1024 clock pulses. The counter continues putting out a low level signal as shown in FIG. 20A-(e) so that the inverter $INl_2$ continues putting out a high level signal during the operation being proceeding normally and properly and also the gate $KAND_1$ continues issuing a high level signal during this time. Thus, during film winding operation being normal, no stop sequence can be effected by the output of the counter and picture taking goes on smoothly.

However, when there occurs any change in normal film winding operation, for example, when a full length of film has been wound up and there is left no portion of film $F_1$ or $F_2$ to be wound up further, the film winding shaft 97 will stop rotating. In this case, the switch $SW_4$ remains in the position of On or Off as it is as shown in FIG. 20B-(b) and also the exclusive OR gate $Klx_1$ continues to have a low level signal at its output at the time of completion of film winding as shown in FIG. 20B-(d). Therefore, the counter $CCl_1$ remains in the state released from resetting and it is now allowed to count the clock pulse CP up to 1024 pulses. When 1024 pulses are counted by the counter, there is produced from its output terminal 1024 a high level signal as shown in FIG. 20B-(e) which is applied to the gate $KAND_1$ as a low level signal through the inverter $INl_1$. As a result, the output of the gate $AST_1$ shown in FIG. 16 also becomes a low level signal so that the above described stop sequence comes in effects so as to stop the picture taking operation at once.

In this manner, when there occurs any change in normal film winding operation, the stop sequence works at once to stop the picture taking operation.

As a second case, detection of the amount of film loop is described.

Figure 21:
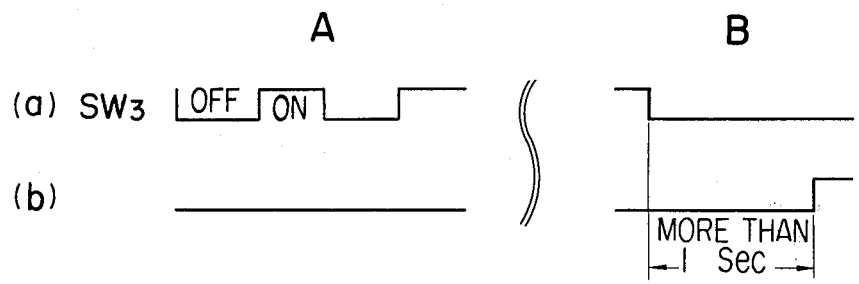
FIG. 21 is a wave form chart for loop amount detection operation.

To detect the loop of film there is provided a loop sensor switch $SW_3$ is formed in such manner that it is turned Off when the film is slackened to the extent beyond a predetermined limit and it is turned On when the slack of film is under the limit and that its On-Off is carried out during one rotation of the shutter. As shown in FIG. 21A-(a), the time duration of On or Off of the switch is extremely short. Counter $CCl_2$ is constructed in such manner that it is released from resetting when the switch $SW_3$ is On. When the control of loop amount operates normally, the counting operation time of $CCl_2$ corresponds to the time during which the switch $SW_3$ is Off. Therefore, the counting operation time is also extremely short. The counter $CCl_2$ is so formed as to count a clock pulse CP of 1 mm sec. cycle through the gate $ANDl_2$. Since the counter can not count the clock pulse up to 1024 pulses during normal operation, the counter $CCl_2$ continues to put out from its output terminal 1024 a low level signal as shown in FIG. 21A-(*b*). Accordingly, as long as the amount of film loop is correctly controlled, the output of the inverter $INl_3$ retains a high level signal so that like the case of normal film winding operation, stop sequence never comes in effect during this time and picture taking goes on further.

However, if the slack of film is unduly increased for some reason to such extent that jamming trouble of film may be caused thereby, then the time duration of Off of the switch $SW_3$ will become longer as shown in FIG. 21B-(*a*). As described above, the counter $CCl_2$ is so designed as to continue counting for the time length during which the switch $SW_3$ is Off. Therefore, when the Off time of $SW_3$ is prolonged over one second for a reason as mentioned above, then the counter $CCl_1$ is allowed to count pulse CP of 1 mm sec. cycle up to 1024 pulses and to produce from its output terminal 1024 a high level signal as shown in FIG. 21B-(*b*). The high level signal thus issued from the output terminal 1024 is inverted by the inverter $INl_3$ into a low level signal which is then introduced into the gate $KAND_1$. Thereby, the output of the gate $AST_1$ shown in FIG. 16 is changed to a low level signal so that the above described stop sequence comes into effect and picture taking operation is automatically stopped. In this manner, whenever the amount of loop is not correctly controlled, the stop sequence works at once to stop the picture taking operation.

As a third case, detection of change in control of shutter rotation is described.

Figure 22:
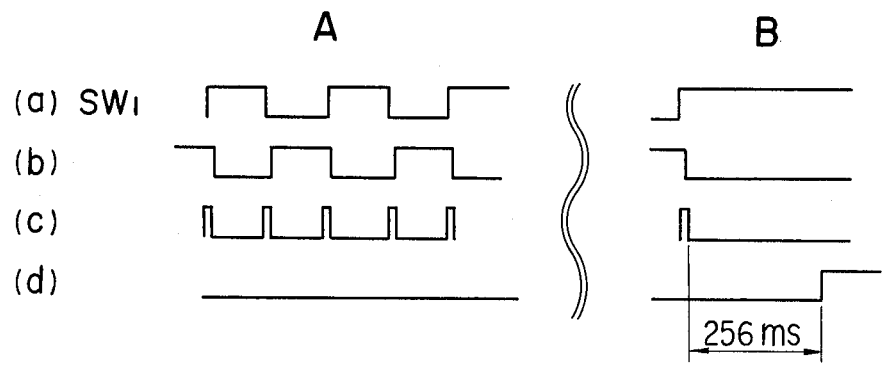
FIG. 22 is a wave form chart for disorder detection operation.

As described above, normally picture taking with this motion picture camera proceeds at the speed of 18 frames per second and therefore the time required for one rotation of shutter is determined to be about 55 mm seconds. Since the switch $SW_1$ is so constructed as to perform one On-Off action for one rotation of the shutter, the normal cycle of the switch $SW_1$ is 55 mm seconds as shown in FIG. 22A-(*a*). Accordingly, as shown in FIG. 22A-(*b*), the output Q of the flip-flop $KFF_2$ produces a pulse signal of 55 mm seconds cycle and at a half cycle of it, namely at the cycle of 22.5 mm seconds the exclusive OR gate $Kex_2$ puts out a pulse signal as shown in FIG. 22A-(*c*). Therefore, counter $CCl_3$ is reset at the cycle of 22.5 mm sec.. The counter $CCl_3$ can not have counting operation time longer than 22.5 mm seconds so long as the shutter rotates normally. On the other side, the counter is so formed as to produce a high level signal from its output terminal 256 only when the counter has counted 256 pulses of clock pulse of 1 mm second cycle through the gate $ANDl_3$. It takes about 256 mm seconds until the counter counts such 1 mm second cycle pulse up to 256 pulses. Therefore, during normal rotation of the shutter, the counter $CCl_3$ continues putting out from its output terminal 256 a low level signal as shown in FIG. 22A-(*d*) and the inverter $INl_4$ continues putting out a high level singal. Under this state of operation, there occurs no change of the output of $KAND_1$ from high to low level through the output of the counter $CCl_3$. Thus, during the time when the operation of shutter is in normal state, the stop sequence never comes into effect and motion picture taking goes on.

However, during this picture taking, if the rotation of the shutter is stopped for any reason, then the switch $SW_1$ will remains in its position of On or Off as it is as shown in FIG. 22B-(*a*) and therefore the flip-flop $KFF_2$ will continue putting out from its output Q a low level signal as shown in FIG. 22B-(*b*). As a result, the exclusive OR gate $Kex_2$ continues putting out a low level signal and now the counter is allowed to continue counting the clock pulse CP of 1 mm second cycle up to 256 pulses. When the counting of the counter reaches 256 counts in this manner, the counter $CCl_3$ produces a high level signal as shown in FIG. 22B-(*d*) which is applied to the gate $KAND_1$ as a low level signal through the inverter $INl_4$. Thereby, the output of $KAND_1$ is changed to a low level signal. As a result, the above mentioned stop sequence starts working and the picture taking is stopped. In this manner, whenever the rotational operation of shutter becomes unusual, the stop sequence comes into effect at once to stop the picture taking operation.

As seen from the foregoing, according to the invention it is assured that whenever there occurs any change in every normal control operation, the stop sequence comes into effect at once so as to stop the photographing operation. In addition, occurrence of such abnormal condition of operation is indicated by the lamp $KLP_1$ to the operator. When there occurs any change in any control operation, the NAND gate $KNAND_1$ also detects it at the same time and produces from its output a high level signal which in turn makes the transistor $KTr_1$ turn On. Thereby, the lamp $KLP_1$ is put on which gives the operator a notice of disorder in operation.

Furthermore, according to the shown embodiment of the invention, such mistake that the operator starts photographing without charging of film is prevented. As described above, the switch $SW_9$ is turned Off when a film is laid on the film gate member 21*a* and it is On when film is absent. Therefore, when the camera is not charged with film, the gate $KAND_1$ produces output of low level signal so that no trigger operation can be effected. This prevents the operator from erroneously carrying out picture taking with no film being charged. The absence of film is also indicated by the lamp $KLP_1$ which puts on at that time because the gate $KAND_1$ produces a high level signal.

For photographing with a silent film, switch $SW_3$ remains always On as described above. The counter $CCl_2$ is in reset position and the second timer circuit remains inoperative. Therefore, stop sequence through the second timer circuit can not be effected and only abnormal change in film winding operation and in shutter operation may be detected in a similar manner to that described above for photographing with sound film.

While the invention has been particularly shown and described with reference to preferred embodiments thereof, it will be understood by those skilled in the art that the foregoing and other changes in form and details can be made therein without departing from the spirit and scope of the invention.

What we claim is:

1. A motion picture camera comprising:
   (a) film feeding means including a motor-driven intermittent feed mechanism and a continuous feed mechanism;

(b) loop sensing means for sensing the length of film loop between said intermittent feed mechanism and said continuous feed mechanism to output different signals in accordance with the film loop length;
(c) motor-speed control means for changing over the speed of an intermittent film feed motor in accordance with the signal from said loop sensing means;
(d) control means adapted to output a signal when the signal from said loop sensing means is maintained at a predetermined value for a predetermined time period; and
(e) means for stopping said motor in accordance with the signal from said control means.

2. A motion picture camera comprising:
(a) film feeding means including a motor-driven intermittent feed mechanism and a continuous feed mechanism;
(b) loop sensing means for sensing the length of film loop between said intermittent feed mechanism and said continuous feed mechanism to output different signals in accordance with the film loop length;
(c) motor-speed control means for changing over the speed of an intermittent film feed motor in accordance with the signal from said loop sensing means;
(d) control means adapted to output a signal when the signal from said loop sensing means is maintained at a predetermined value for a predetermined time period;
(e) means for stopping said motor in accordance with the signal from said control means; and
(f) alarm indicating means for indicating the stopping of said intermittent feed motor due to the signal from said control means.

* * * * *

UNITED STATES PATENT AND TRADEMARK OFFICE
CERTIFICATE OF CORRECTION

PATENT NO. : 4,240,720

DATED : December 23, 1980

INVENTOR(S) : NORITSUGU HIRATA, ET AL.

It is certified that error appears in the above—identified patent and that said Letters Patent is hereby corrected as shown below:

IN THE ABSTRACT

Line 3, delete "to".

Column 2, line 51, "entend" should be --extent--

Column 3, line 38, after "speed", insert --set--.

Column 6, lines 50 & 51, change "botton" to --button--; line 59, change "botton" to --button--.

Column 10, line 42, change "betweena" to --between a--; line 50, "Rotately" should be --Rotatively--.

Column 11, line 66, "the" (first occurrence) should be --to--.

Column 16, line 40, "sot" should be --slot--; line 45, "sot" should be --slot--; line 48, "opeing" should be --opening--.

Column 17, line 50, "72" should be --71--.

UNITED STATES PATENT AND TRADEMARK OFFICE
CERTIFICATE OF CORRECTION

PATENT NO. : 4,240,720

DATED : December 23, 1980

INVENTOR(S) : NORITSUGU HIRATA, ET AL.

It is certified that error appears in the above—identified patent and that said Letters Patent is hereby corrected as shown below:

Column 18, line 64, after "take-up", insert --shaft--.

Column 19, line 29, "describe" should be --described-- line 57, "temporally" should be --temporarily--.

Column 20, line 23, "slidingly" should be --sliding-- line 23, "sliding" should be --slidingly--; line 24, after "free", insert --end--.

Column 27, line 9, after "same", delete ",".

Column 30, line 44, "turnes" should be --turns--.

Column 33, line 51, "ect." should be --etc.--

Column 34, line 16, "countered" should be --counted--; line 61, after "$SW_3$", insert --which--.

Column 35, line 65, "singal" should be --signal--.

Column 36, line 6, after "is", insert --,--.

Signed and Sealed this

Twenty-ninth Day of September 1981

[SEAL]

Attest:

GERALD J. MOSSINGHOFF

Attesting Officer     Commissioner of Patents and Trademarks